United States Patent
Mishra et al.

(10) Patent No.: US 8,831,000 B2
(45) Date of Patent: Sep. 9, 2014

(54) IP MULTICAST SERVICE JOIN PROCESS FOR MPLS-BASED VIRTUAL PRIVATE CLOUD NETWORKING

(71) Applicant: Telefonaktiebolaget L M Ericsson, Stockholm (SE)

(72) Inventors: Ramesh Mishra, San Jose, CA (US); Howard Green, San Jose, CA (US); Stephan Baucke, Milpitas, CA (US); James Kempf, Mountain View, CA (US); Mallik Tatipamula, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 15 days.

(21) Appl. No.: 13/649,026

(22) Filed: Oct. 10, 2012

(65) Prior Publication Data

US 2014/0098813 A1    Apr. 10, 2014

(51) Int. Cl.
*H04L 12/28*  (2006.01)
*H04L 12/56*  (2006.01)

(52) U.S. Cl.
USPC ............ 370/390; 370/252; 370/400; 370/401

(58) Field of Classification Search
USPC ......... 370/252, 254, 229, 230, 235, 388, 255, 370/390, 395.53, 400, 401, 389, 392, 395
See application file for complete search history.

(56) References Cited

U.S. PATENT DOCUMENTS

| | | | |
|---|---|---|---|
| 2007/0153712 A1* | 7/2007 | Fry et al. | 370/263 |
| 2010/0146093 A1* | 6/2010 | Kuik | 709/223 |
| 2010/0306408 A1* | 12/2010 | Greenberg et al. | 709/238 |
| 2011/0261815 A1* | 10/2011 | Armstrong et al. | 370/390 |
| 2011/0317703 A1* | 12/2011 | Dunbar et al. | 370/392 |
| 2012/0008528 A1* | 1/2012 | Dunbar et al. | 370/255 |
| 2012/0014387 A1* | 1/2012 | Dunbar et al. | 370/395.53 |
| 2012/0069842 A1* | 3/2012 | Reddy et al. | 370/388 |
| 2013/0322441 A1* | 12/2013 | Anumala | 370/390 |
| 2013/0322453 A1* | 12/2013 | Allan | 370/395.53 |
| 2013/0329605 A1* | 12/2013 | Nakil et al. | 370/255 |

OTHER PUBLICATIONS

Wen C. et al., "Centralized Control and Management Architecture Design for PIM-SM Based IP/MPLS Multicast Networks", Global Telecommunications Conference, 2007. GLOBECOM '07. IEEE, whole document.

Hamidi et al., "A New Distributed Protocol for Multicasting over MPLS", Proceedings of the International MultiConference of Engineers and Computer Scientists 2008 vol. II, IMECS2008, Mar. 19-21, 2008, Hong Kong, whole document.

Rosen E. et al., "Multiprotocol Label Switching Architecture", RFC 3031, Internet Engineering Task Force, Jan. 2001, the whole document.

(Continued)

*Primary Examiner* — Abdullah Riyami

(57) ABSTRACT

A multicast cloud controller ("MCC") in a cloud system implements a process to manage multicast traffic in a cloud network. The MCC is coupled to at least one virtualized server for hosting one or more virtual machines ("VM"), wherein the virtualized server comprises at least one virtual switch ("VS") that supports multiprotocol label switching (MPLS) and the virtual switch is coupled to a top of rack switch ("TORS") that supports MPLS. MPLS is utilized to support multicast data traffic in the cloud system such that the system and method reduces state and is scalable.

40 Claims, 19 Drawing Sheets

(56) References Cited

OTHER PUBLICATIONS

Aggarwal R. et al., "Multicast in VPLS", draft-ietf-l2vpn-mpls-mcast-10.txt, IETF, Feb. 2, 2012, the whole document.
Lasserre M. et al., "Virtual Private LAN Service (VPLS) Using Label Distribution Protocol (LDP) Signaling", RFC 4762, IETF, Jan. 2007, the whole document.
Ooms D. et al., "Overview of IP Multicast in a Multi-Protocol Label Switching (MPLS) Environment", RFC 3353, Internet Engineering Task Force, Aug. 2002, the whole document.
Cain B. et al., "Internet Group Management Protocol, Version 3", RFC 3376, Internet Engineering Task Force, Oct. 2002, the whole document.
Vida R. et al., "Multicast Listener Discovery Version 2 (MLDv2) for IPv6", RFC 3810, Internet Engineering Task Force, Jun. 2004, the whole document.

* cited by examiner

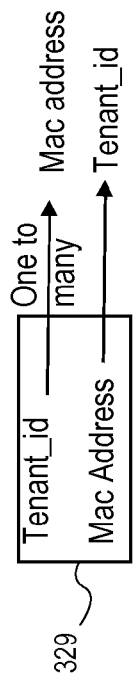
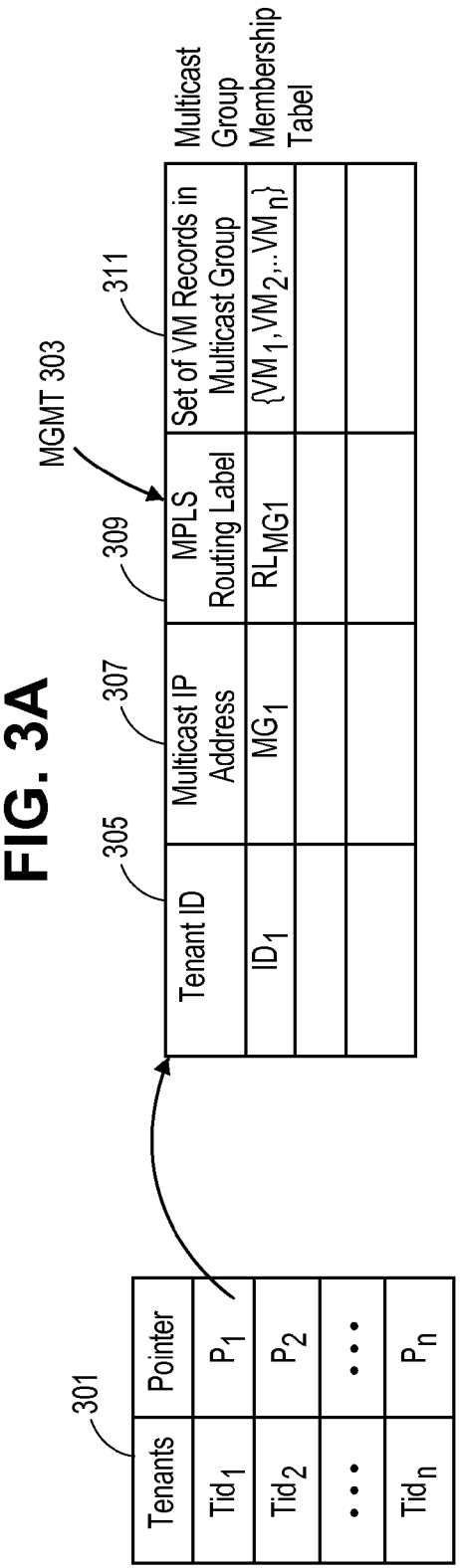
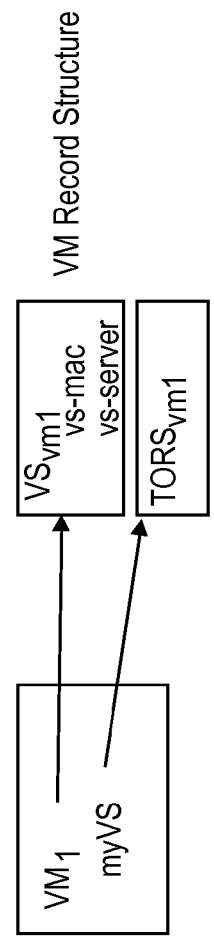
FIG. 3A
FIG. 3B
FIG. 3C

IP MULTICAST SERVICE JOIN PROCESS FOR MPLS-BASED VIRTUAL PRIVATE CLOUD NETWORKING

FIELD

Embodiments of the invention relate to the field of cloud computing; and more specifically, to multicast support in cloud computing.

BACKGROUND

Large corporations have for many years been concentrating their computer resources in data centers. This trend has accelerated over the last few years as server virtualization technology has become more and more prevalent. As data centers have become larger, some data center operators have begun to offer computing, storage, and network communication resources to outside customers who then become tenants of the data center. The offered services typically consist of elastic, on demand processing, storage that for most practical purposes is limited only by the tenant's ability to pay, and network bandwidth into the Internet. This development is called cloud computing.

Server virtualization technology allows a pool of servers to be managed as essentially one large computer resource. A layer of software called a hypervisor sits between the operating system and the hardware. The hypervisor schedules the execution of virtual machines (VMs) on a virtualized server. A VM is an operating system image packaged with some applications. The hypervisor allows a VM to be suspended and moved between servers to load balance. Load balancing and monitoring of VM execution to catch crashes provides the same kind of fault tolerance and scalability services for enterprise applications that are achieved at much higher cost with specialized solutions. These systems are referred to herein as a "cloud system." A cloud manager system oversees the execution of VMs in the cloud system; scheduling execution to meet demand, to optimize server utilization, and to minimize power consumption. The cloud execution manager can schedule execution to allow in-service upgrade of hardware and software without impacting ongoing service provision.

In order to support arbitrary movement of VMs between machines, the networking within the cloud system must also be virtualized. Most cloud systems today virtualize the network by incorporating a virtual switch into the hypervisor. The virtual switch provides virtual network ports to the VMs executing under the control of the hypervisor. The virtual switch software also allows the network resources to be virtualized in a manner similar to how the server resources are virtualized by the hypervisor. The hypervisor and the virtual switch can thereby cooperate to allow VMs to be moved between servers. When the hypervisor moves a VM, it communicates with the virtual switch about the new location, and the virtual switch ensures that the network routing tables for the VM's addresses (e.g., a layer 2 Media Access Control (MAC) address, and the layer 3 internet protocol (IP) address) are updated so packets are routed to the new location.

Multicast is a system for the delivery of data to a group of subscribing nodes (e.g., VMs) by a source node. Some services provided by the VM within the cloud system could benefit from the implementation of a multicast protocol within the data center. However, such multicast protocol support is not supported by the cloud systems, because these multicast protocols require a large amount of control state to be maintained that exceed the capacity of the host machines and would diminish the performance of the data center and all cloud services.

SUMMARY

A multicast cloud controller ("MCC") in a cloud system implements a process to manage multicast traffic in a cloud network. The MCC is coupled to at least one virtualized server for hosting one or more virtual machines ("VM"), wherein the virtualized server comprises at least one virtual switch ("VS") that supports multiprotocol label switching (MPLS) and the virtual switch is coupled to a top of rack switch ("TORS") that supports MPLS. The process to manage multicast traffic includes receiving a join message at the MCC, wherein the join message indicates that a VM has requested to join a multicast group. The VM is added to a set of VMs of a tenant, where the set of VMs are subscribed to the multicast group. A VS and a TORS are looked up for the VM by the MCC using a VM record maintained by the MCC. At least one flow table entry is installed at the VS for the VM. The at least one flow table entry configures inbound multicast traffic of the multicast group to be forwarded to the VM and configures outbound multicast traffic of the multicast group to be sent to the TORS of the VM. At least one flow table entry is installed at the TORS of the VM, the at least one flow table entry of the TORS to configure the TORS to forward the outbound multicast traffic of the multicast group by MPLS to other TORS of the cloud system with VMs subscribing to the multicast group and to configure the TORS to forward incoming multicast traffic of the multicast group to the VS of the VM.

A method is performed by a multicast cloud controller ("MCC") in a cloud system to manage multicast traffic in a cloud network. The MCC is coupled to at least one virtualized server for hosting one or more virtual machines ("VM"). The virtualized server comprises at least one virtual switch ("VS") that supports multiprotocol label switching (MPLS) and the virtual switch is coupled to a top of rack switch ("TORS") that supports MPLS. A join message is received in a form of an internet group management protocol report message or multicast listener discovery report message at the MCC, wherein the join message indicates that a VM has requested to join a multicast group. The VM is added to a set of VMs of a tenant, where the set of VMs are subscribed to the multicast group, the set of VMs tracked in a multicast group management table along with a multicast group label. A VS and a TORS fare looked up for the VM by the MCC using a VM record maintained by the MCC. A forwarding action is installed in an input group of the VS to forward multicast group traffic to an internet protocol address of the VM. A check is made whether the VM is a first VM to subscribe to a multicast group at the TORS, where the VM is the first VM. A flow table entry is installed at the TORS to push backbone routing label onto a packet. A flow table entry is installed at the TORS to match a multicast label and forward the packet to an output port of a destination TORS. A flow table entry is installed at the other TORS to forward multicast group packets to other TORS with subscribing VMs. Flow table entries are installed at the TORS to forward multicast group packets to all VS in rack with VM subscribing to the multicast group. A flow table entry is installed at the TORS to match a backbone routing label in a packet, to decapsulate the backbone routing label and to forward the packet to next table of the TORS. A flow table entry is installed to match a multicast group label in the packet, to decapsulate the multicast group label, and to forward the packet to subscribing VMs via associated VSs using an input group.

A multicast cloud controller ("MCC") is implemented in a cloud system. The MCC is coupled to at least one virtualized server for hosting one or more virtual machines ("VM"). The virtualized server comprises at least one virtual switch ("VS") that supports multiprotocol label switching (MPLS) and the virtual switch is coupled to a top of rack switch ("TORS") that supports MPLS. The MCC includes a processor to execute a join group module, a leave group module and a VM movement module, each module in communication with the other modules. The join group module manages multicast group join operations. The join group module is configured to receive a join message in a form of an internet group management protocol report message or multicast listener discovery report message at the MCC. The join message indicates that a VM has requested to join a multicast group. The join group module is further configured to add the VM to a set of VMs of a tenant, where the set of VMs are subscribed to the multicast group, to look up a VS and a TORS for the VM by the MCC using a VM record maintained by the MCC. The join group module is configured to install at least one flow table entry at the VS for the VM, the at least one flow table entry to configure inbound multicast traffic of the multicast group to be forwarded to the VM and to configure outbound multicast traffic of the multicast group to be sent to the TORS of the VM, and configured to install at least one flow table entry at the TORS of the VM. The at least one flow table entry of the TORS configures the TORS to forward the outbound multicast traffic of the multicast group by MPLS to other TORS of the cloud system with VMs subscribing to the multicast group and to configure the TORS to forward incoming multicast traffic of the multicast group to the VS of the VM.

A multicast cloud controller ("MCC") is implemented in a cloud system to manage multicast traffic in a cloud network. The MCC is coupled to at least one virtualized server for hosting one or more virtual machines ("VM"). The virtualized server comprises at least one virtual switch ("VS") that supports multiprotocol label switching (MPLS) and the virtual switch is coupled to a top of rack switch ("TORS") that supports MPLS. The MCC includes a processor to execute a join group module, a leave group module and a VM movement module, each module in communication with the other modules. The join group module manages multicast group join operations. The join group module is configured to install the VM to a set of VMs of a tenant. The set of VMs are subscribed to the multicast group. The set of VMs are tracked in a multicast group management table along with a multicast group label. The join group module looks up a VS and a TORS for the VM using a VM record maintained by the MCC and installs a forwarding action in an input group of the VS to forward multicast group traffic to an internet protocol address of the VM. The join group module checks whether the VM is a first VM to subscribe to a multicast group at the TORS, where the VM is the first VM. The join group module installs a flow table entry at the TORS to push backbone routing label onto a packet. The join group module installs a flow table entry at the TORS to match a multicast label and forward the packet to an output port of a destination TORS. The join group module installs a flow table entry at the other TORS to forward multicast group packets to other TORS with subscribing VMs. The join group module installs flow table entries at the TORS to forward multicast group packets to all VS in rack with VM subscribing to the multicast group. The join group module installs a flow table entry at the TORS to match a backbone routing label in a packet. The join group module decapsulates the backbone routing label and forwards the packet to next table of the TORS. The join group module installs a flow table entry to match a multicast group label in the packet, decapsulates the multicast group label, and forwards the packet to subscribing VMs via associated VSs using an input group.

BRIEF DESCRIPTION OF THE DRAWINGS

The invention may best be understood by referring to the following description and accompanying drawings that are used to illustrate embodiments of the invention. In the drawings:

FIGS. 3A-C are diagrams of one embodiment of data structures maintained by a multicast controller (MCC).

DETAILED DESCRIPTION

Figure 1A:
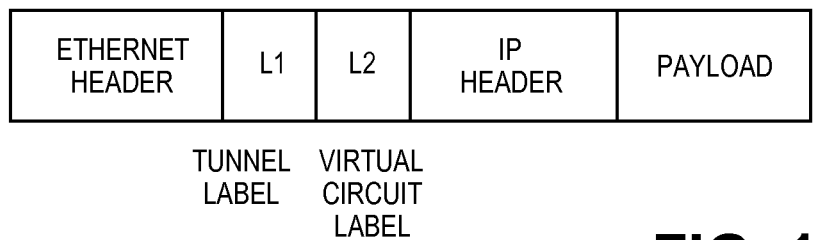
FIGS. 1A and 1B are diagrams of label stacks.

The following description describes methods and apparatus for managing multi-protocol label switching (MPLS) flow entries to support multicast in a cloud network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention.

It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

The techniques shown in the figures can be implemented using code and data stored and executed on one or more electronic devices. Such electronic devices store and communicate (internally and/or with other electronic devices over a network) code and data using non-transitory tangible computer-readable storage medium (e.g., magnetic disks; optical disks; read only memory; flash memory devices; phase-change memory) and transitory computer-readable communication medium (e.g., electrical, optical, acoustical or other forms of propagated signals-such as carrier waves, infrared signals, digital signals, etc.). In addition, such electronic devices typically include a set or one or more processors coupled with one or more other components, such as a storage device, one or more input/output devices (e.g., keyboard, a touchscreen, and/or a display), and a network connection. The coupling of the set of processors and other components is typically through one or more busses or bridges (also termed bus controllers). The storage device and signals carrying the network traffic respectively represent one or more non-transitory tangible computer-readable medium and transitory computer-readable communication medium. Thus, the storage device of a given electronic device typically stores code and/or data for execution on the set of one or more processors of that electronic device. Of course, one or more parts of an embodiment of the invention may be implemented using different combination of software, firmware, and/or hardware.

Overview

The embodiments, as described herein below, provide a method and apparatus that use the multi-protocol label switching (MPLS) service to support Internet Protocol (IP) multicast. In particular, the embodiments use the MPLS service to support the IP multicast in data centers to support cloud computing services.

Data centers are often organized as a set of physical computing devices that execute virtualized services. These physical computing devices can be organized into racks or groups of devices that can individually or in combination execute the virtualized services. The physical computing devices can be networked with other physical devices in the rack and with the physical devices in other racks through a set of top of rack switches (TORS). These TORS are connected to each physical device in their rack and then to each other or a subset of the TORS in the data centers. The TORS can be networked in a mesh topology with the other TORS of the data center. This mesh or network fabric can include any number of intermediate networking devices to connect the TORS and other devices. The TORS can also be connected either directly or indirectly with devices outside the data center. This data center architecture is further described herein below in greater detail.

Many data centers serving as cloud computing facilities only support Web services applications. Web services applications consist of a load balancing front end that dispatches requests to a pool of Web servers. The requests originate conceptually from applications on the Internet and therefore the security and privacy requirements are much looser than for applications in a private corporate network. Another cloud computing trend is secure multi-tenancy, in which the cloud service provider offers virtual private network (VPN) like connections between the tenant's distributed office networks outside the cloud and a VPN within the cloud. This allows the tenant's applications within the cloud to operate in a network environment that resembles a corporate wide area network (WAN). For private data centers, in which these services are only offered to customers within the corporation owning the data center, the security and privacy requirements for multi-tenancy are relaxed. For public data centers, the cloud service operator must ensure that the traffic from multiple tenants is isolated from other tenants and there is no possibility for traffic from one tenant to reach another. In either case, cloud computing facilities tend to implement cloud computer networks using media access control (MAC) layer virtual local area networks (VLANs).

For example, two Virtual Private Clouds (VPCs) can be set up for two different external enterprise customers. A VPC consists of a collection of VMs, storage, and networking resources that provide secure multi-tenancy to the enterprises renting space in the cloud. The enterprise customers connect into the VPCs via VPNs over the Internet running on a public operator network.

In order to add a new service instance (e.g., a new virtual machine "VM") to a VPC, a cloud execution manager initializes the VM to run on a hypervisor on a virtualized server. The virtual switch on the virtualized server is configured to include the VM in a VLAN that is part of the VPN for the tenant adding the new VM. In some cases, a virtual customer edge router is updated for the new service and a provider edge router in the cloud computing facility is updated with the new service.

In order to provide VPNs, cloud system implements one of three solutions. In a first possible solution, each tenant receives a separate VLAN slice. In a second possible solution, tenant VPNs are implemented using IP encapsulation. In a third possible solution, tenant VPNs are implemented using MAC address encapsulation. Each of these solutions suffer from different deficiencies. If the cloud system implements VLAN isolation, then each tenant is assigned a separate VLAN tag and the cloud network is run as a flat Layer 2 network. The VLAN tag has 12 bits, so if a cloud operator uses VLAN isolation the number of tenants is restricted to 4096. This limit on the number of possible tenants is a major limitation on the scalability of the cloud system.

Another problem with VLAN isolation is that standard area networking (e.g., LAN, WAN, MAN; Institute of Electrical and Electronics Engineers (IEEE) 802.1) switching uses the spanning tree protocol (STP) to set up routes. In order to remove the possibility of routing loops, STP designates one and only one path between a source address and a destination address, regardless of whether there are multiple routes. This can lead to congestion and underutilization of the switching fabric when the spanning tree route comes under traffic pressure and alternate routes are neglected.

If the cloud system implements IP encapsulation, then the cloud system is run as a routed IP network and IP tunnels are used to isolate each tenant's traffic. The traffic from a tenant is encapsulated in an IP packet (typically using Generic Routing Encapsulation (GRE)) with the endpoints of the tunnel being the source and destination virtual switches on the source and destination virtualized servers where the VMs are running.

IP encapsulation allows a client to define an arbitrary layer 2 service on top by encapsulating Ethernet frames in Layer 2 Tunneling Protocol (L2TP). It also allows large numbers of tenants, constrained only by the cloud system-wide IP address space. The tenant can also deploy their own IP address space on top of the IP tunnels. However, without other measures, IP routing also selects a single route and so multipath routes are neglected, leading to unnecessary congestion. The cloud routing can utilize Equal Cost Multipath to spread packets over multiple links but at the cost of additional configuration complexity. In general, configuring an IP routed network is time consuming and routers tend to be more expensive devices than simple switches. In addition, IP networks have limited means to provision dedicated bandwidth, which might be necessary for large data flows.

If the cloud system implements MAC encapsulation, then the separate tenant VPNs are implemented by being encapsulated inside MAC tunnels, similar to IP encapsulation. The endpoints of the MAC tunnels are typically the virtual switches on the source and destination virtualized servers where the VMs are running. MAC encapsulation offers similar benefits to IP encapsulation over VLAN isolation, with the added benefit that the cloud can be run as a flat Layer 2 network if desired. The disadvantage is that there are few standards for the signaling protocols for MAC encapsulation, unlike IP, and, although there are standards for data plane encapsulation, they are not used in some existing cloud management software products. This runs the risk of not working with certain types of hardware. Configuring and maintaining a MAC encapsulation network is also more complex than maintaining a VLAN isolated network.

In embodiments of the invention, a cloud system uses MPLS to form VPNs for VPC tenants, and programs flow routes in the virtual switches and TORS. For example, MPLS switches can have programmed flow routes via OpenFlow as described in OpenFlow Switch Specification Version 1.1.0, February 2011. A virtual switch can use Ethernet MAC addresses to route packets to VMs on a virtualized server, and to classify packets into particular MPLS label switch paths (LSPs), but after the virtual switch, neither Ethernet nor IP addresses are used for routing. Instead, routing is done strictly using MPLS labels that are assigned based on the IP and MAC destination addresses. The process is similar to but not identical with the Virtual Private Wire Service (VPWS) or Layer 3 VPNs (L3VPNs) in wide area networks.

In one embodiment, a Cloud Network Manager (CNM) executed by an OpenFlow controller can install flow routes using OpenFlow into a virtual switch on a virtualized server where a VM is running. The flow routes encapsulate Ethernet frames from tenant VMs on the virtualized server with an MPLS label designating the route and specific to the tenant between the TORS and a virtual switch on the destination side. The packets are then forwarded to the source VM's virtualized server's TORS. The source TORS then routes the packets into the data center network fabric. If the cloud network fabric is an MPLS network then, the source TORS pushes another MPLS label which specifies the route between the source TORS and the destination TORS. The destination TORS pops the MPLS routing label and uses the label pushed on by the source virtual switch to route the packet to the appropriate destination server and virtual switch. The destination virtual switch pops the TORS to virtual switch label and forwards the packet to the correct VM based on the destination MAC address. If the cloud switch fabric supports some other technology, such as optical, the TORS performs a suitable adaptation.

This use of MPLS in a cloud system provides numerous advantages. For example, no IP routing is required on the data plane thereby removing the cost, power usage, and complexity of having an IP routed cloud network. The cloud architecture only requires inexpensive MPLS switches. The switch fabric in the cloud system can be a standard Ethernet switch, an MPLS capable switch, an optical circuit-switch, or even a mixture, for example, optical for high capacity flows and electrical for other traffic. The switch fabric could even be a wide area network between distributed computing resources. The TORS handles the encapsulation appropriately. The number of tenants that can be supported is not limited to the size of MPLS label space. The tenant can manage its own IP address space (if desired) and DNS server (if desired). Routing details into the cloud switch fabric are handled by the TORS where the right mix of scalability and aggregation can be achieved.

On top of this MPLS based routing in the cloud system that uses VPNs for IP unicast between VMs in a VPC using MPLS on the data plane and OpenFlow on the control plane, the embodiments of provide a method to handle multicast in the MPLS based VPC network. Since the cloud system is using MPLS in the data plane, the cloud system does not need the control plane complexity of MPLS multicast otherwise necessary in distributed control plane networks. Avoiding this overhead provides an advantage in terms of scalability and bandwidth utilization such that multicast can be practically and effectively implemented in a cloud system.

At a high level, the embodiments work as follows. The Virtual Switch (VS) forwards internet group management protocol (IGMP) packets for IPv4 or multicast listener discover (MLD) packets for IPv6 from a VM to the Multicast Cloud Controller (MCC). The MCC adds the VM to the multicast group and installs routes on the source side VS and TORS routing the multicast packets from the VM to the multicast group. Each multicast group is assigned an MPLS label. If this is the first VM on the rack to join the group, the MCC also installs routes on other TORS serving racks with VMs in the group, routing packets for the group to the new TORS.

The advantages of this implementation of multicast include that there is no IP routing required on the data plane, removing the cost, power usage, and complexity of having an IP routed cloud network. The embodiments can be implemented using inexpensive MPLS switches. The network fabric in the cloud system between the TORSes can be a standard Ethernet switch, an MPLS capable switch, an optical circuit-switch, or even a mixture, for example, optical for high capacity flows and electrical for other traffic. The network fabric could even be a wide area network between distributed computing resources. The TORS handles the encapsulation appropriately. Routing details into the cloud network fabric are handled by the TORS where the right mix of scalability and aggregation can be achieved.

As discussed to some degree above there are various problems with existing solutions. In multitenant cloud systems today, the cloud system operators do not enable multicast because it requires too much control state in the routers and interferes with VM movement. In contrast, the embodiments remove the control state from the routers and puts it into the OpenFlow controller, which can run in a server with a large amount of memory. In addition, the embodiments radically reduce the amount of control state required in order to handle multicast, because the data center network is so regular, consisting of top of rack switches, aggregation switches and routers, and virtual switches. The embodiments also handles VM movement properly.

The embodiments feature a centralized control plane, where a centralized OpenFlow controller directly programs the top of rack switches and the virtual switches. Scalability is handled by keeping all of the control plane state on a server where the amount of memory can be very large, except for the flow table state necessary to implement forwarding. The OpenFlow controller directly programs the switches. Since the embodiments are based on a centralized control plane, the embodiments do not require the use of link discover protocol (LDP) or border gateway protocol (BGP) within the cloud system. Traffic is duplicated per TOR switch on the ingress side but only sent to the TOR switches that are serving racks with VMs subscribed to the multicast group, the embodiments are very efficient.

Figure 1B:
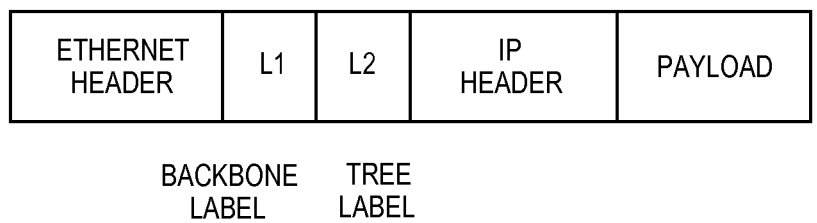

The embodiments have a unique label stack. The standard (RFC 4762) VPLS label stack on which multicast is built looks like FIG. 1A. The label stack of the embodiments is shown in FIG. 1B. The important distinction between the embodiments and the VPLS label stack is that in VPLS, a multicast packet from different hosts running on different VLANs but for the same tenant will have different VLAN labels whereas the embodiments utilize the same label for a multicast group for the same tenant. In the embodiments, the multicast tree label is adjacent to the tenant packet's IP header and the backbone mesh label is on the top of stack. In one embodiment, the MPLS multicast described herein is terminated at the site border router (premise equipment (PE) or customer equipment (CE) router) since the label stack is not compatible with standard MPLS VPN label stacks.

Cloud System Architecture

Figure 2:
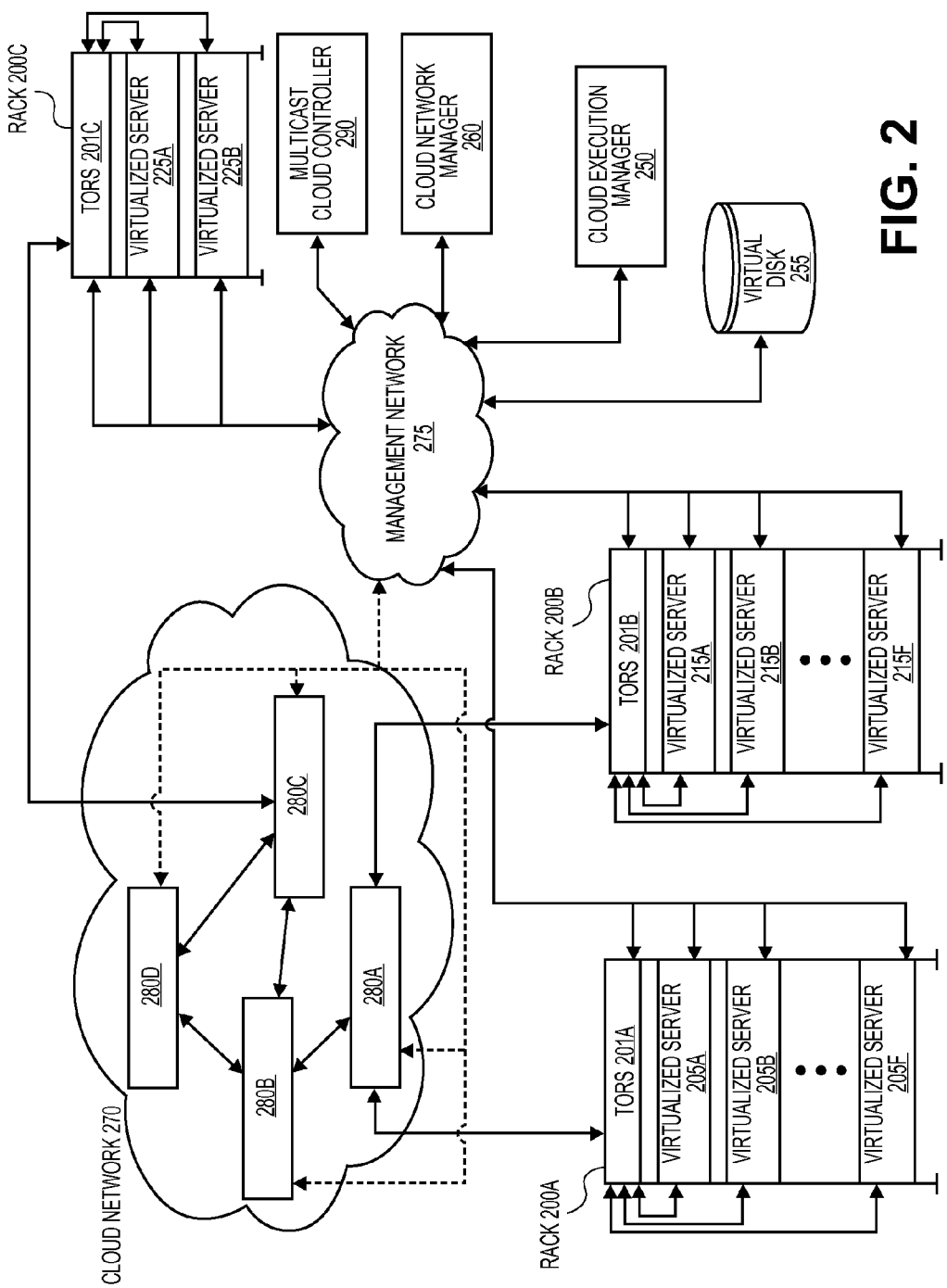
FIG. 2 is a diagram of one embodiment of components in a cloud system.

FIG. 2 illustrates components in a cloud system according to one embodiment of the invention. The cloud system comprises a plurality virtualized servers in a plurality of racks 200A-D coupled through a cloud network 270. Of these virtualized servers and racks, three racks 200A, 200B, and 200C are illustrated. Each illustrated rack comprises a top of rack switch (TORS) and a plurality of virtualized servers. Rack 200A comprises a TORS 201A and a plurality of virtualized servers 205A-205N. Rack 200B comprises a TORS 201B and a plurality of virtualized servers 215A-215N. Rack 200C comprises a TORS 201C, virtualized server 225A, and virtualized server 225B. Each TORS 200A-200C couples the plurality virtualized servers within that rack and is further coupled with a cloud network 270. The structure of the cloud network 270 can support any type of switching or routing protocol, for example an optical circuit-switched network or a network of OpenFlow MPLS switches. The cloud network 270 could even be a wide area network (WAN) that runs between distributed server racks. The connectivity in the figure is provided by way of example and not limitation, there are many ways to couple TORS in a cloud network 270 also referred to herein as a network fabric.

In the example of FIG. 2, the cloud network 270 comprises a plurality of switching elements (e.g. switches or routers) 280A-280D. Each TORS 200A-200C and each virtualized server 205A-205N, 215A-215N, 225A, and 225B can further be coupled with a management network 275. The management network 275 couples the TORSs and the virtualized servers with management elements. The management elements comprise a cloud execution manager 250, a virtual disk 255, multicast cloud controller (MCC) 290 and a cloud network manager 260.

The cloud execution manager (CEM) 250 schedules VMs for execution, and includes an Object Manager for mapping VMs into and out of the virtual disk 255 which provide permanent storage for each VM's image. A cloud network manager (CNM) 260 manages the VPNs for the tenants VPCs.

The MCC configures the flow table entries in the TORS for implementing multicast and tracks the state data required to implement multicast. The MCC can maintain a multicast group management table (MGMT) for each tenant. The MCC can also track on a per tenant basis a MAC address to Tenant ID mapping (1:1), Tenant ID to MAC address mappings (1:m), and OpenFlow Group ID for every tenant for all multicast groups. The MCC contains one MGMT per tenant. The tenant is identified by a Tenant ID ($Tid_n$) which is unique for every tenant. When a new tenant initiates a request to create a VPC, a corresponding entry in the MCC is also created. The MGMT contains records for multicast groups. Each record contains the following information: the multicast IP address of the group, the set of VM records for VMs contained in the multicast group, and the MPLS routing label for the group.

The multicast data traffic can be segregated per tenant and the MCC creates an OpenFlow multicast group identifier (ID) $IG_1 \ldots IG_n$ for multicast addresses per tenant as needed. In one embodiment, the multicast group ID in the OpenFlow table is a combination of multicast address and the tenant ID. The multicast groups can be precreated in the OpenFlow tables when a tenant requests a virtual private cloud (VPC) or could be created at run time when the first join operation is received for a given multicast address. A set of data structures maintained by the MCC are populated with entries as tenants join multicast groups. These data structures are discussed further herein below.

FIGS. 3A-C are diagrams of one embodiment of some of the data structures maintained by the MCC. FIG. 3A illustrates a tenant tracking structure 329 that stores correlations between Tenant IDs and associated MAC addresses, while each MAC address is similarly correlated with a Tenant ID. FIG. 3B illustrates a MGMT tracking table 301 contains pointers to each MGMT 303 for each tenant, where a tenant is identified by the Tenant ID ($Tid_n$). The MGMT 303 include entries correlating the Tennant IDs 305 with Multicast IP addresses ($MG_n$) 307, MPLS routing label ($RL_{MGn}$) 309 for a multicast group, and a set of VM records 311 for each VM of the tenant subscribing to the multicast group.

FIG. 3C illustrates that a VM record 325 (e.g., in the set of VM records 311) additionally contains pointers to the VSs ($VS_{VMn}$), which support the VMs (including the MAC and server identification of VS) and the TORS (including a MAC of the TORS) for the racks in which the VMs are executing. Each of the data structures of FIGS. 3A-C is maintained by the MCC at the OpenFlow controller, which will have sufficient working memory or similar storage devices to store the data structures for all multicast within the cloud system.

Figure 4:
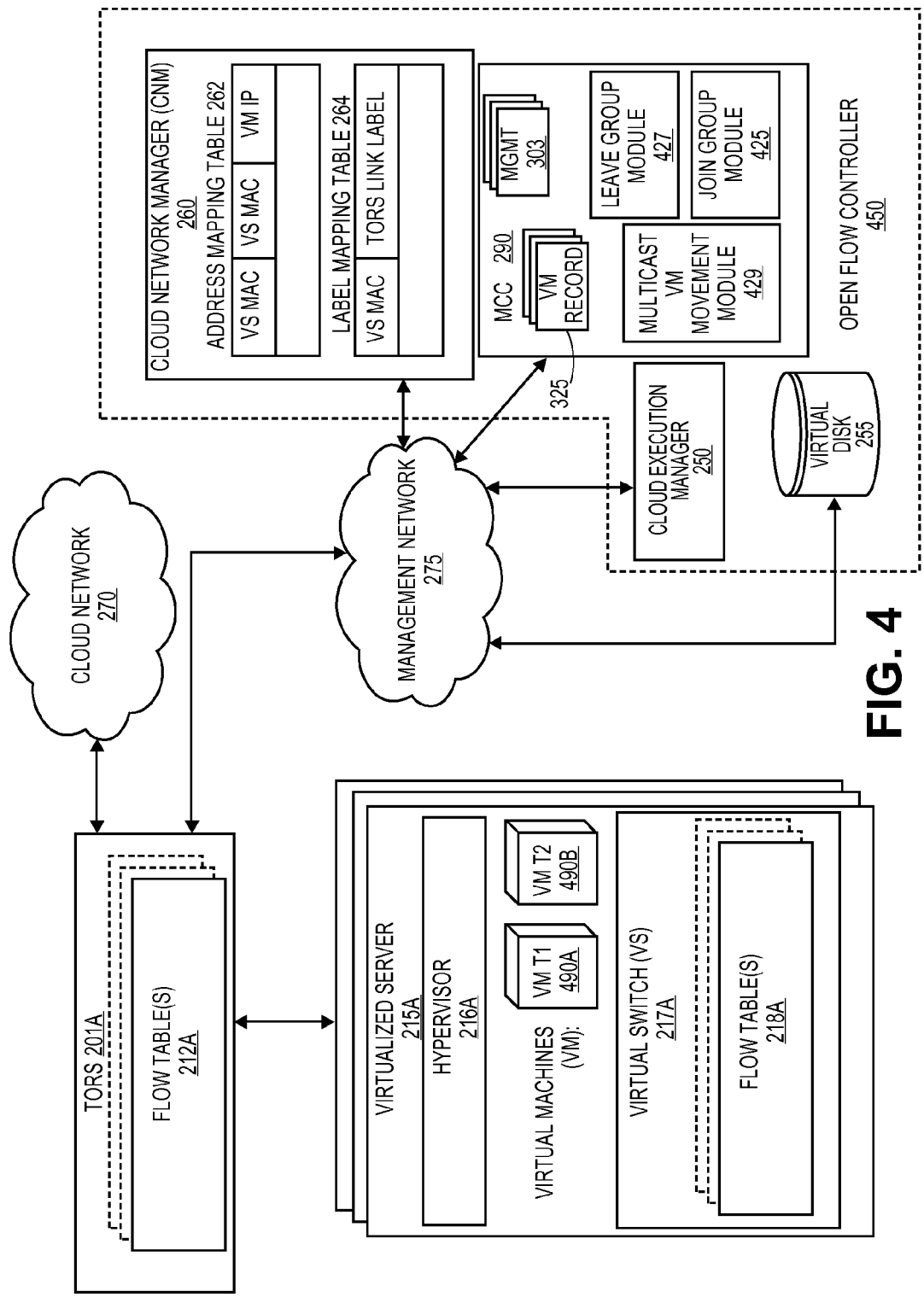
FIG. 4 is a diagram of another embodiment of the components in a cloud system.

FIG. 4 is a diagram of components in a cloud system supporting VM migration and VM communication using MPLS according to one embodiment of the invention. FIG. 4 shows a TORS 201A that comprises one or more flow entry tables 212A-Z. The flow entry tables 212A-Z used to match MPLS labels with MPLS actions as described with reference to the OpenFlow specification. The TORS 201A is coupled with one or more virtualized servers 215A-N.

Each virtualized server 215A-N is configured to execute one or more VMs. In FIG. 4, the virtualized server 215A comprises a hypervisor 216A which schedules the execution of VMs (e.g., VM T1 and VM T2). The virtualized server 215A further comprises a virtual switch 217A. The virtual switch 217A provides virtual network ports to the VMs executing under the control of the hypervisor 216A. The virtual switch 217A is an MPLS enabled switch that comprises one or more flow entry tables 218A-Z used to match MPLS labels with MPLS actions as described with reference to the OpenFlow specification.

The TORS 201A is coupled with a cloud network 270 such as the cloud network described in FIG. 2. The TORS 201A is further coupled with a management network 275. As in FIG. 2, the management network 275 couples the TORSs and the virtualized servers with management elements such as a CEM 250, MCC 290, a virtual disk 255, and a CMN 260. The CMN 260 comprises tables describing the VPN including an address mapping table 262 and a label mapping table 264. The address mapping table 262 maps between the MAC address of a VM, the MAC address of the virtualized server (which is the virtual switch's 217A MAC address) that is running the VM, and the VM's IP address. The label mapping table 264 maps the virtualized server's 215A MAC address (which is the virtual switch's 217A MAC address) to a TORS link label for the link between the virtual switch 217A and TORS 201A. In other embodiments, the CNM 260 keeps track of which Dynamic Host Configuration Protocol ("DHCP") and Domain Name Service ("DNS") (if any) servers belong to which tenant.

In one embodiment, the CNM assumes that tenant VMs are well behaved with respect to how they configure their IP stacks and that they do not arbitrarily change their IP/MAC addresses. If a tenant VM misbehaves and make such a change, its packets will be routed to the CNM and the CNM will inform the CEM. The CEM can then shut down the offending VM.

The MCC 290 includes the MGMT 303, VM records 325 and other data structures for managing multicast traffic as described herein above. The MCC 290 or CNM 260 can also configure flow table entries 218A in the VS 217A to forward all multicast reporting messages such as internet group multicast protocol (IGMP) or multicast listener discovery (MLD) messages to the MCC 290. The MCC 290 or CNM 260 can also create or remove flow entries in the flow entry table 212A or VS 217A flow entry table 218A to manage the implementation of multicast in the cloud system, such as a effecting a join operation for a multicast group, leaving a multicast group or VM migration as described further herein below.

In one embodiment, the CNM 260, MCC 290, CEM 250 and similar components can be implemented in an OpenFlow controller 450. The OpenFlow controller 450 can thereby implement the control plane for the cloud system network fabric. The management of the TORS 201A and VS 215A is therefore effected by configuration of flow table entries in the flow tables 212A and 218. The flow tables are maintained by application of the OpenFlow flow table update messages as defined in the OpenFlow specification.

VM Activation

Figure 5:
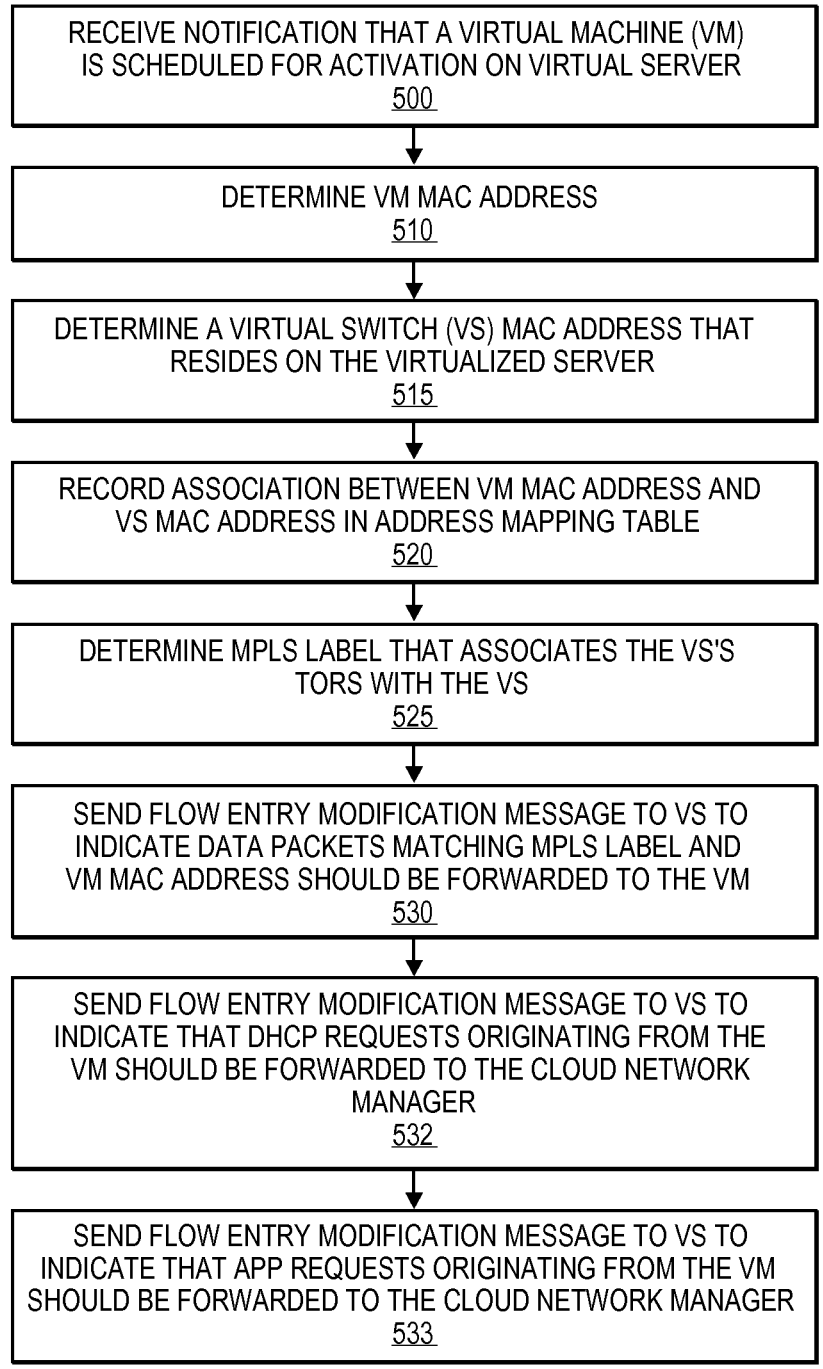
FIG. 5 is a flow chart of one embodiment of a process for activating a virtual machine in the cloud system.

FIG. 5 illustrates a block diagram of a method for activating a virtual machine according to one embodiment of the invention. In block 500, a CNM receives notification that a VM is scheduled for activation on a virtualized server. For example, a CEM notifies the CNM that the CEM has scheduled the VM for activation. The CNM determines the VM's MAC address in block 510. In one embodiment, the CEM provides the CNM with the VM's MAC address along with the notification while in another embodiment the CEM provides the CNM with the VM's MAC address in a separate message. In block 515, the CNM determines a virtual switch's MAC address corresponding with the virtual switch that resides on the virtual server on which the VM will be activated. In block 520, the CNM records an association between the VM's MAC address and the virtual switch's MAC address in the CNM's address mapping table. The CNM further determines, in block 525, an MPLS label that associates the virtual switch with the TORS that is coupled with the virtual switch. In block 530, the CNM sends a flow entry modification message to the virtual switch to indicate that data packets matching the MPLS label and the VM's MAC address should be forwarded to the VM. In one embodiment, the CNM sends a flow entry modification message, in block 532, to the virtual switch to indicate that DHCP requests originating from the VM should be forwarded to the CNM. In another embodiment, the CNM sends a flow entry modification message, in block 533, to the virtual switch to indicate that Address Resolution Protocol ("ARP") requests originating from the VM should be forwarded to the CNM.

Figure 6:
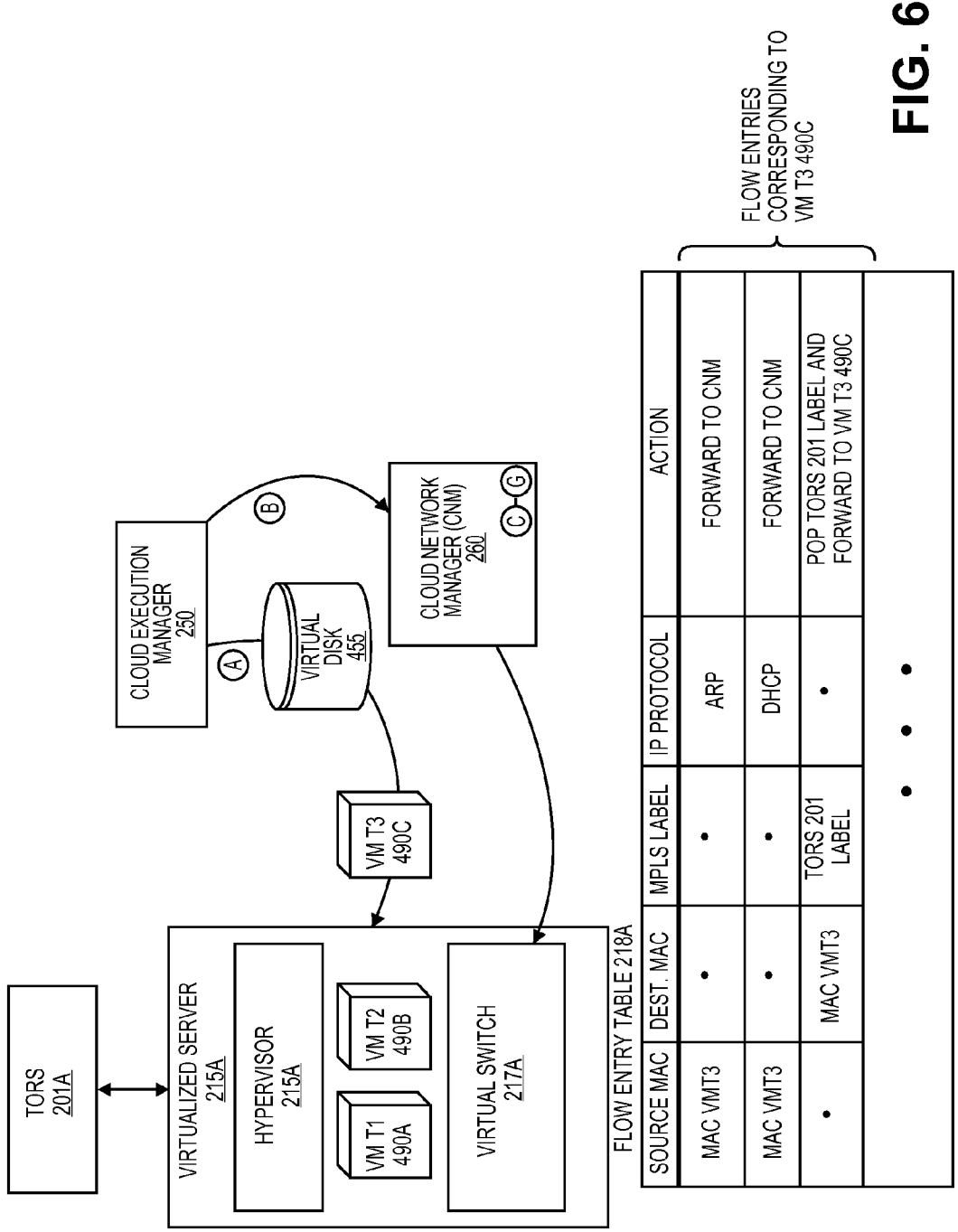
FIG. 6 is a diagram of one embodiment of a process for activating a virtual machine.

FIG. 6 illustrates a method for activating a virtual machine according to one embodiment of the invention. In FIG. 6, a TORS 201A is coupled with a virtualized server 215A. The virtualized server 215A comprises a hypervisor 216A and a virtual switch 217A. In FIG. 6, the virtualized server 215A has two active VMs T1 and T2 490A and 490B. Further, FIG. 6 shows a CEM 250, a virtual disk 255, and a CNM 260.

In FIG. 6, the CEM 250 is scheduling a third VM T3 490C for execution on the virtualized server 215A. This figure illustrates various points during the activation of a virtual machine. At point A, the CEM 250 schedules the VM T3 490C, e.g. a VM belonging to Tenant 1 for execution. The object file is mapped from the virtual disk 255 through the CEM's Object Manager. The CEM edits the VM 490C stack to set the VM's 490C MAC address to one of the MAC addresses assigned to Tenant 1. At point B, The CEM 250 informs the CNM 260 of the activation. It provides the CNM 260 with the MAC address of the VM 490C and the MAC address of the virtualized server 215A on which the VM executes (which is the MAC address of the virtualized server's 215A virtual switch 217A).

At point C, The CNM 260 records the MAC address of the VM 490C in the CNM's address mapping table (not shown) along with the MAC address of the virtualized server 215A on which it has been scheduled. At point D, The CNM 260 looks up the virtual switch to TORS 201A MPLS label for the link between the virtualized server 215A on which the VM 490C is running and the TORS 201A (this is also known as the source TORS "STORS" link label) from the CNM 260 label mapping table. At point E, the CNM 260 sends a flow entry modification message to the MPLS enabled virtual switch 217A to install a rule that matches the VM's 490C MAC and the STORS link label with an action to pop the STORS link label and forwards the packet to the VM 490C.

In one embodiment, the CNM 260 sends a second flow entry modification message, at point F, to the virtual switch 217A to install the following rule. If the source MAC matches the MAC address for VM 490C and the protocol is ARP, route the packet to the CNM 260 to allow the CNM 260 to service the ARP request. This rule reduces the ARP traffic and allows the CNM 260 to answer from the CNM address mapping table.

In another embodiment, the CNM 260 sends a third flow entry modification message, at point G, to the virtual switch 217A to install the following rule. If the source MAC matches the MAC address for VM 490C and the protocol is DHCP, route the packet to the CNM 260 to allow the CNM 260 to service the DHCP request. This rule allows the CNM 260 to record a MAC address to IP address mapping in the CNM address mapping table by intercepting the reply packet from a DHCP server.

FIG. 6 illustrates three entries in a flow entry table 218A of the virtual switch 217A assuming that all three previously described flow entry modification messages were communicated. The flow entry table 218A has five columns illustrated: a source MAC, destination MAC, MPLS label, IP protocol, and action. The flow entries correspond to the activation of 490C.

The first entry in flow entry table 218A illustrated matches the MAC address of VM T3 490C as a source MAC address. The destination MAC address and MPLS label are set to match any entry while the IP protocol is set to match on the ARP protocol. The action is then to forward to CNM 260. This rule corresponds with step F described above.

The second entry in flow entry table 218A illustrated matches the MAC address of VM T3 490C as a source MAC address. The destination MAC address and MPLS label are set to match any entry while the IP protocol is set to match on the DHCP protocol. The action is then to forward to CNM 260. This rule corresponds with step G described above.

The third entry in flow entry table 218A illustrated matches all MAC addressed as a source MAC address. The destination MAC address is set to match the MAC address of VM T3 490C while the MPLS label is set to the TORS 201 label. The IP protocol is set to match on all entries. The action is then to pop the MPLS label and forward the packet to VM T3 490C. This rule corresponds with step E described above.

As described above, a CNM maintains a mapping between a VM MAC address, virtualized server MAC, and VM IP address. If a tenant has elected not to use DHCP addresses, then the CEM modifies the VM's IP stack prior to execution scheduling and installs a static IP address. However, in other embodiments a tenant will elect to use DHCP addresses. In such a case, the CNM will intercept DHCP requests and act as a relay in accordance with "DHCP Relay Agent Information Option," IETF, RFC 3046, January 2001.

DHCP Requests

Figure 7:
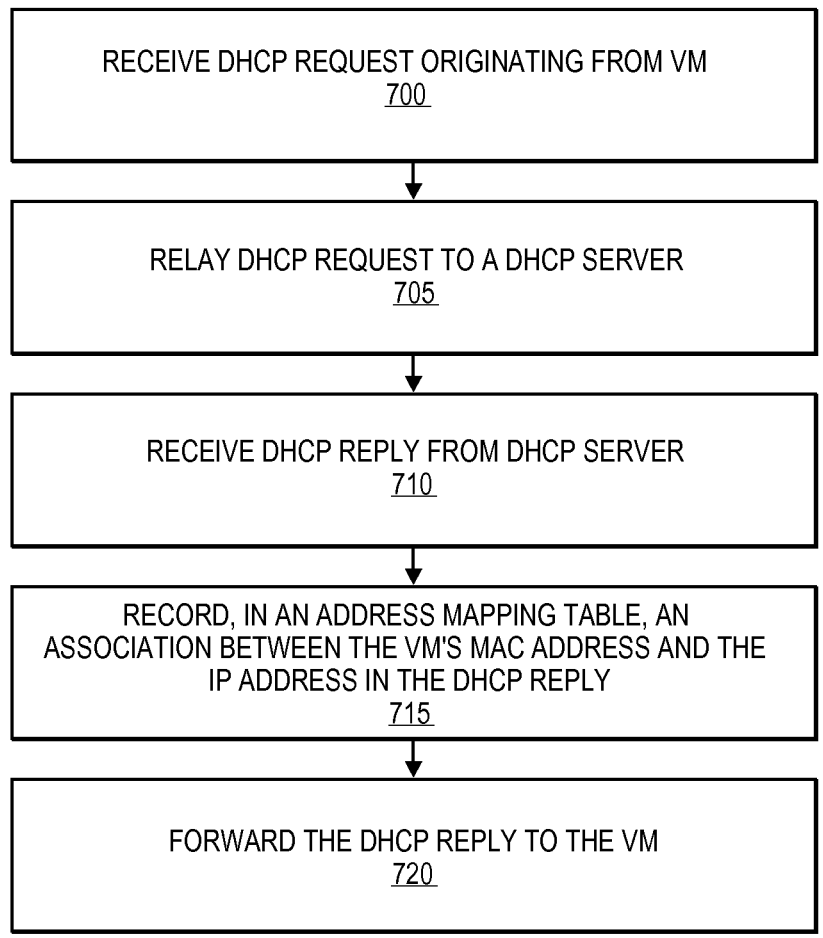
FIG. 7 is a flowchart of one embodiment of a process for intercepting DHCP requests from a VM.

FIG. 7 illustrates a block diagram of a method for intercepting DHCP requests from a VM according to one embodiment of the invention. At block 700, the CNM receives the DHCP request that originated from a VM. The CNM relays the DHCP request to a DHCP server in accordance with RFC 3046 at block 705. At block 710, the CNM receives a DHCP reply from the DHCP server. At block 715, the CNM records an association in an address mapping table between the VM's MAC address and the IP address received in the DHCP reply. In accordance with embodiments of the invention, the association further includes the MAC address of the virtual server executing the VM. At block 720, the CNM forwards the DHCP reply to the VM.

Figure 8:
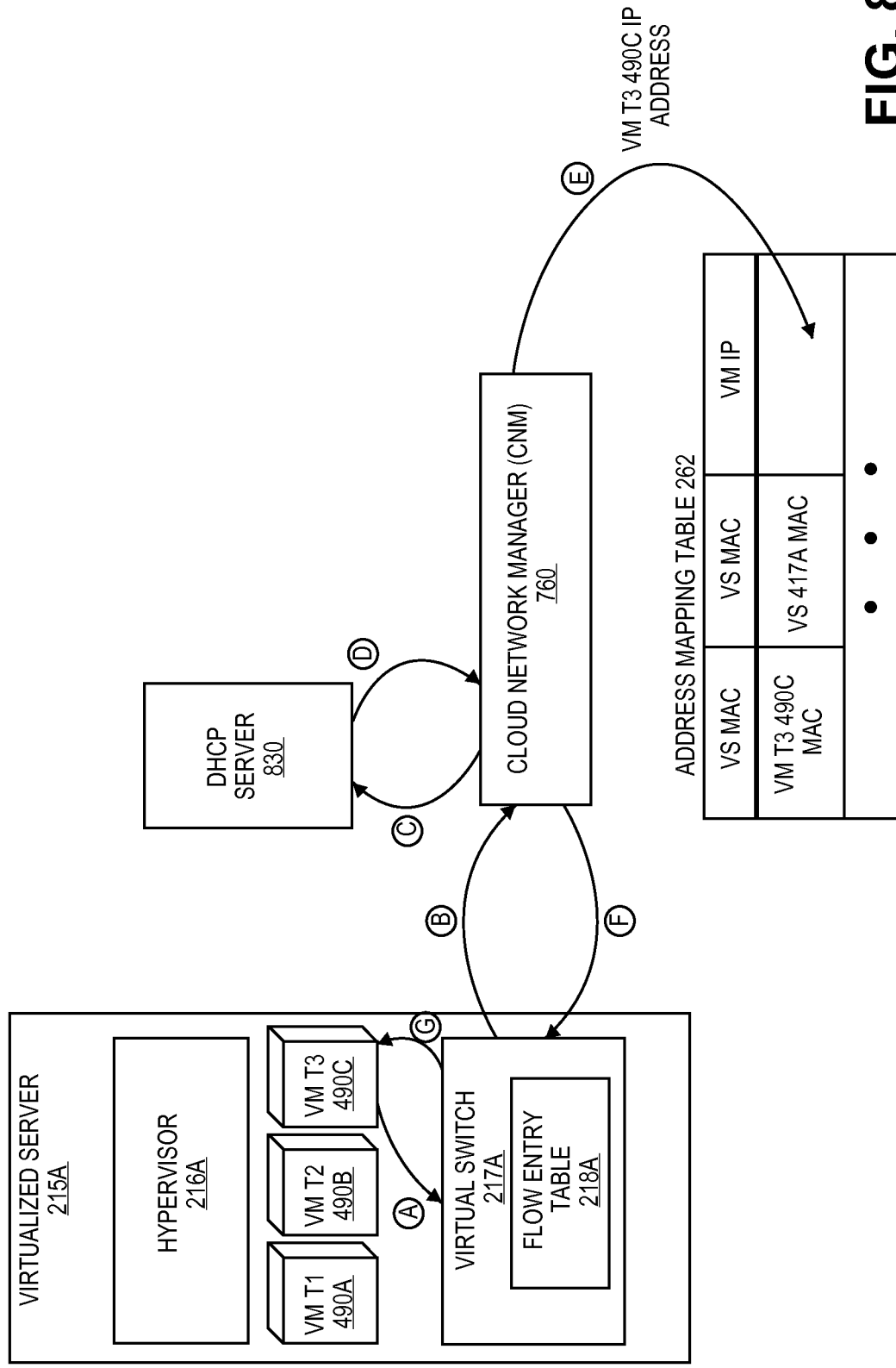
FIG. 8 is a diagram of one embodiment of a process for intercepting DHCP requests from a virtual machine.

FIG. 8 illustrates a method for intercepting DHCP requests from a virtual machine according to one embodiment of the invention. In FIG. 8, a virtualized server 215A comprises a hypervisor 216A and a virtual switch 217A. In FIG. 8, the virtualized server 215A has three active VMs T1, T2, and T3 490A-490C. The virtual switch 217A comprises a flow entry table 218A that includes a rule to forward DHCP requests from VM T3 490C to a CNM 660 which is coupled with a DHCP server 630.

This figure illustrates various points during the interception of a DHCP request from a virtual machine. At point A, the VM T3 490C issues a DHCP Request to obtain an IP address and other configuration information, such as the DNS server. At point B, the virtual switch 217A matches the request with a flow rule to route the DHCP request to the CNM 260. At point C, the CNM 260 acts as a DHCP relay, inserts a standard DHCP Relay Option, and forwards the request to the tenant's DHCP server 630. The CNM 260 can determine which tenant the VM T3 490C belongs to by examining the source MAC address of the DHCP request. At point D, The tenant's DHCP server 230 responds with a DHCP Reply containing an IP address for the VM T3 490C and other configuration information. At point E, the CNM 260 records the mapping between the VM T3 490C MAC address and the IP address in the CNM's address mapping table 262. At point F, the CNM 260 strips off the DHCP Relay Option and forwards the DHCP replay to the virtual switch 217A which forward the request back to VM T3 490C at point G.

In the typical IP LAN scenario, a source application running in a server wishing to communicate with a destination application uses DNS to discover the IP address of the destination application. After the IP address is found, the IP stack in the source server broadcasts an ARP message to discover a mapping between the IP address and the MAC address of the destination. If the destination is on the local LAN, it replies to the ARP. If the destination is not running on the local LAN, the source server IP stack uses the MAC address of a local router as a gateway to other subnets.

In the cloud, VMs run on top of a virtualized LAN. The tenant runs its own DNS server, or buys DNS service from the cloud operator. A VM is configured with the address of the DNS server it is to use. When the tenant wants to contact a service, it sends a DNS request to the DNS server to discover the IP address, exactly as in a normal corporate LAN. The DNS server can be under control of the cloud operator or it can be controlled by the individual tenant. When the DNS reply returns, the VM broadcasts an ARP request to determine the IP to MAC address mapping.

In embodiments of the invention, a virtual switch intercepts the ARP message and relays it to a CNM rather than broadcasting it. The CNM provides an address mapping service so that the ARP messages do not need to be broadcast throughout the cloud network.

ARP Requests

Figure 9:
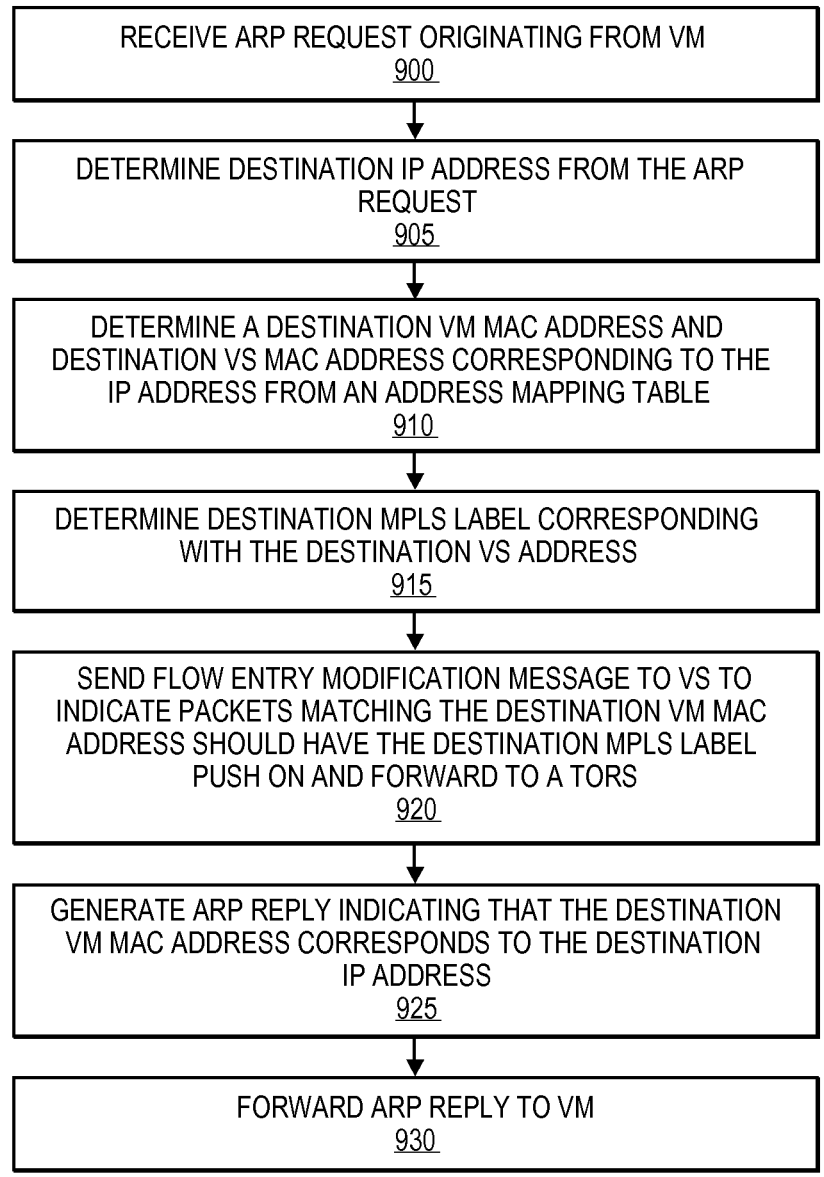
FIG. 9 is a flowchart of one embodiment of a process for intercepting ARP requests from a VM.

FIG. 9 illustrates a block diagram of a method for intercepting ARP requests from a VM according to one embodiment of the invention. At block 900, a CNM receives an ARP request that originated from a VM. The CNM determines the destination IP address from the ARP request at block 905. At block 910, the CNM determines a destination VM MAC address and destination virtual switch MAC address corresponding to the IP address. For example, the CNM can look up the mapping from the CNM's address mapping table based on the IP address within the ARP request. At block 915, the CNM determines a destination MPLS label that corresponds with the destination virtual switches MAC address. At block 920, the CNM sends a flow entry modification message to the virtual switch on the virtual server that is executing the source VM. The entry modification message indicates that packets matching the destination VM MAC address should have the destination MPLS label pushed on and get forwarded to a TORS for the source virtual switch. At block 925, the CNM generates an ARP reply indicating the destination VM MAC address corresponds to the destination IP address.

The CNM forwards the ARP reply to the source VM in block 930.

Figure 10:
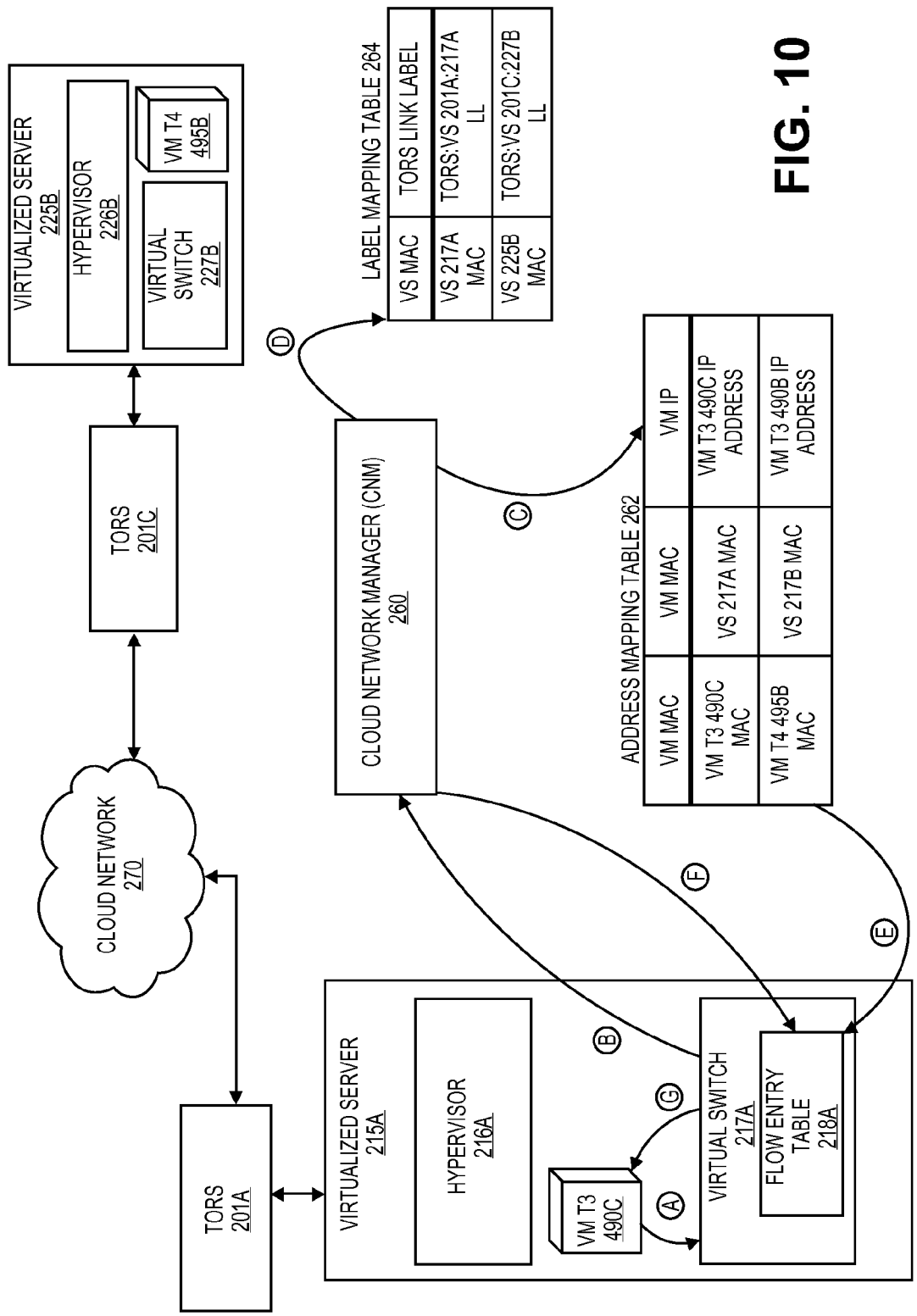
FIG. 10 is a diagram of one embodiment of a process for intercepting ARP requests from a virtual machine.

FIG. 10 illustrates a method for intercepting ARP requests from a virtual machine according to one embodiment of the invention. In FIG. 10, a virtualized server 215A comprises a hypervisor 216A and a virtual switch 217A. In FIG. 8, the virtualized server 215A has an active VM T3 490C. The virtual switch 217A comprises a flow entry table 218A that includes a rule to forward ARP requests from VM T3 490C to a CNM 260. The virtualized server 216A is coupled with a TORS 201 that is coupled to another TORS 201C through a cloud network 270. The TORS 201C is coupled with a virtualized server 225B that comprises a hypervisor 226B and virtual switch 227B. The virtualized server 225B is executing VM T4 295B.

This figure illustrates various points during the interception of an ARP request from a VM T3 490C. At point A, the VM T3 490C broadcasts an ARP request. The rest of the interception assumes that the ARP request indicates the IP address of a destination VM T4 495B that resides on the virtual server 225B. The virtual switch 217A intercepts the ARP request and matches the request to a rule in the flow entry table 218A that routes the ARP request to the CNM 260 at point B.

At point C, the CNM 260 uses the requested destination IP address ("DIP") as a key to look up a destination MAC address ("DMAC") in the CNM's address mapping table 262. If the DIP is not present, the destination is not within the cloud and the CNM does not reply to the ARP request. The VM will then use the MAC address of the local router provided. If the DIP address is present in the CNM's address mapping table 262, then the CNM 260 retrieves the DMAC VM address and the DMAC virtualized server address. In this case, the CNM will retrieve VM T4's 295B MAC as the DMAC VM address and virtual switch 227B MAC as the DMAC virtualized server address.

At point D, the CNM looks up the MPLS flow label for the link between the destination TORS and the DMAC virtualized server address from the CNM's label mapping table 264, also known as a destination TORS ("DTORS") link label. This flow label describes the route between the TORS 201A and the virtualized server at the DMAC virtualized server. In this case, the label TORS:VS 201C:227B LL will be retrieved to indicate a route to the TORS 201C from TORS 201A.

At point E, the CNM 260 installs a flow route in the virtual switch's 217A flow entry table 218A. The rule matches the DMAC VM address for VM T4 495B. The action pushes the DTORS link label TORS:VS 201C:227B LL onto traffic packets sent by VM T3 290C to VM T4 895B, then forwards the packet to the TORS 201A. At point F, the CNM 260 returns the ARP reply to the virtual switch 217A which forward the reply to VM T3 490C.

In one embodiment, the CNM 260 installs the TORS-VS rules and actions into the TORS's 201 flow entry table (not shown) prior to returning an ARP reply to the VM. If the cloud network 270 is an MPLS network, rules for LSPs between the TORS within the cloud network 270 switch fabric do not need to be installed when the ARP reply is returned. If the cloud network 270 switches additionally support OpenFlow, the CNM 260 need only install MPLS forwarding rules into the higher level cloud network 270 switches using OpenFlow at the time a new TORS is installed or an existing TORS is decommissioned. If, however, the higher level data center switches do not support OpenFlow, the TORS instead use LDP to set up LSPs between itself and the other TORS, and the LSPs should be configured. The cloud network 270 switches do not need to support IP routing protocols nor do they need to perform routing.

Table 1 illustrates the rule structure of an OpenFlow flow table of a TORS, for the portion of the flow table that deals with traffic being routed to a destination TORS, i.e. outgoing traffic and traffic with destination servers in the current rack according to embodiments of the invention. The rule structure for incoming traffic is further explained later. There is a flow rule in the table for each DTORS (destination TORS)-DVS (destination virtualized server) link label currently in use as a destination by a source VM in the rack. The TORS may additionally cache some flow rules to catch incoming traffic when a VM moves. Traffic coming from the source VMs in rack is routed by matching the MPLS DTORS link label that was pushed by the virtual switch, and actions associated with the rule are activated and applied to the packet. Actions differ depending on the nature of the cloud network.

TABLE 1

| Link Label | Other Fields | Action |
| --- | --- | --- |
| TORS:VS 201C:227B LL | ... | Cloud Network Specific Action |
| TORS:VS 201A:217A LL | ... | Cloud Network Specific Action |

If the cloud network is not an MPLS network, the TORS adapts traffic to the cloud network through OpenFlow virtual ports. A virtual port associated with the actions on flow matching rules processes packets and adds any headers necessary to route the packet into the cloud network. For example, if the network is an optical circuit-switched network, the virtual port may route it through an optical cross connect. One of skill in the art would understand that other types of cloud networks would utilize other adaptation virtual ports.

If, however, the cloud network is an MPLS network then exemplary actions are shown in Table 2. Each action pushes a STORS to DTORS routing label, then sends the packet to an OpenFlow SELECT group. The SELECT group uses Equal Cost Multicast (ECMP) or some other load balancing algorithm to select one output port bucket from the output ports bucket list and forwards the packet to the output port. Load balancing helps avoid congestion and facilitates multi-path utilization of all routes between the two TORS.

TABLE 2

| Link Label | Other Fields | Action |
| --- | --- | --- |
| TORS:VS 201C:227B LL | ... | Push S->D Label; Route Label |
| TORS:VS 201A:217A LL | ... | Push S->D Label; Route Label |

Once the packet reaches the destination TORS, it is routed through the OpenFlow flow tables such as shown in Tables 3 and 4. Assuming the packet has a label of "LABEL-N" at the destination TORS, the rules match the DTORS routing label "LABEL-N" indicating that the packet is destined for this TORS. The action pops the DTORS routing label and sends the packet to Table 4 for processing. The Table 4 rule matches the TORS-VS label for servers in the rack, indicating to which virtualized server the packet is destined. The action forwards the packet out the appropriate port for reaching that virtualized server.

TABLE 3

| Link Label | Other Fields | Action |
|---|---|---|
| LABEL-N | ... | Pop S->D Label; Route Label |
| LABEL-X | ... | Push S->D Label; Route Label |

TABLE 4

| Link Label | Other Fields | Action |
|---|---|---|
| TORS:VS 201C:227B LL | ... | Route Packet to Virtual Switch 227B |
| TORS:VS 201A:217A LL | ... | Push S->D Label; Route Label |

At the virtual switch 227B, the rule that matches the VM T4+s 227B MAC address and the VS-TORS routing label is triggered. The VS-TORS routing label is popped and the packet is forwarded to the VM T4 427B.

One of the most difficult aspects of cloud networking is dealing with the movement of a VM from a first virtualized server to a second virtualized server. The CEM can, at any time, move a VM from one server to another. The movement may be made to optimize server utilization, reduce power consumption or heat generation, or to position the VM closer to access to an external resource, such as a database. When such a movement occurs, the routes to the VM at the old server are no longer valid. Packets "in flight" while the VM is moved can be dropped and new packets may not reach the VM's new location, unless measures are taken to fix up the routes.

Basic VM Migration

Figure 11:
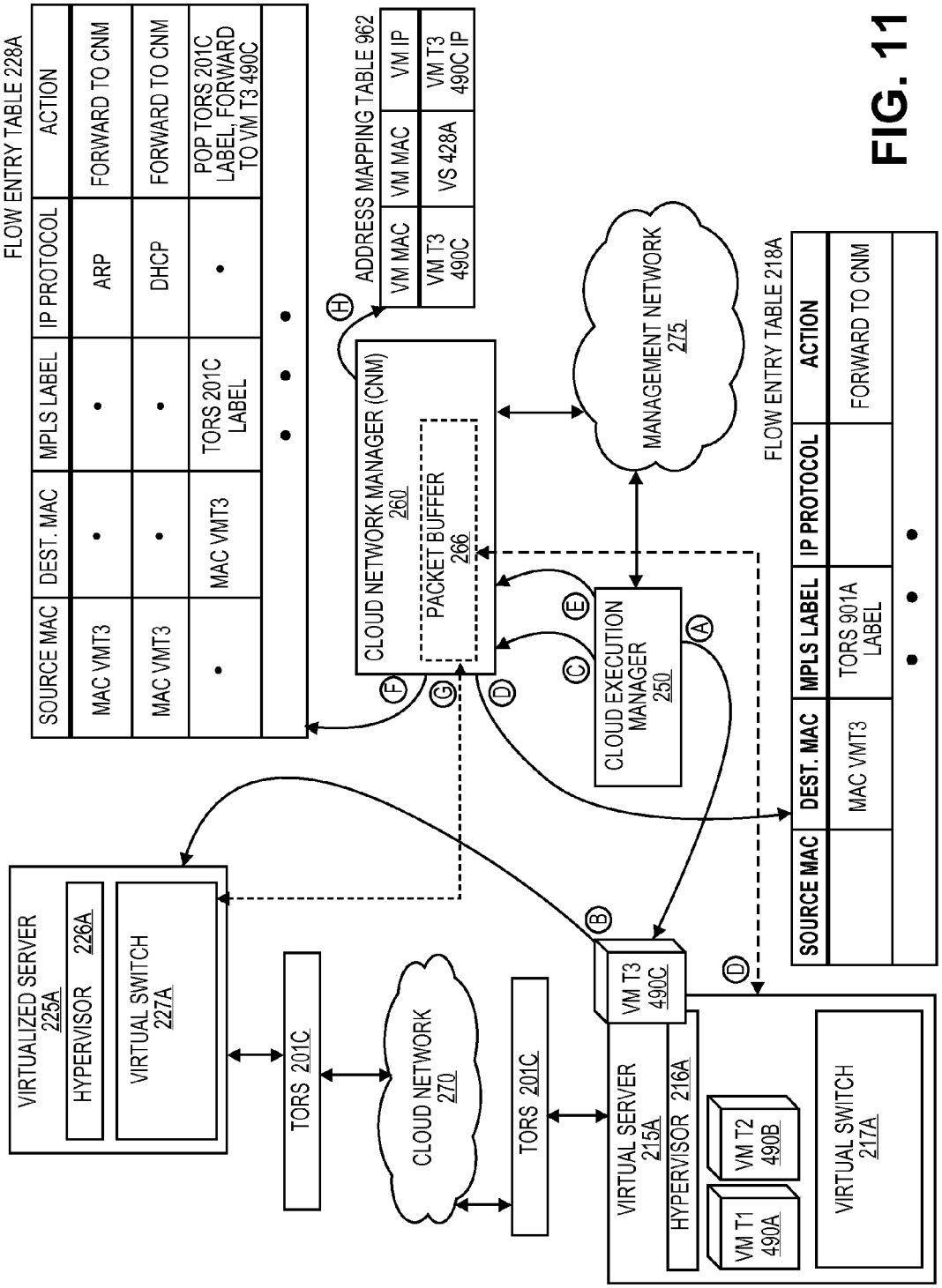
FIG. 11 is a diagram of one embodiment of a process of moving a VM from a first virtualized server to a second virtualized server in cloud computing network.

FIG. 11 illustrates a method of moving a VM from a first virtualized server to a second virtualized server in cloud computing network. In FIG. 11 a first virtualized server 215A (also referred to as the old virtualized server) is coupled with a TORS 201A that is coupled to a cloud network 270. The cloud network 270 couples the TORS 201A with another TORS 201C which is coupled to a second virtualized server 225A (also referred to as the new virtualized server).

Each virtualized server 215A and 225A are configured to run a plurality of VMs and comprise a corresponding hypervisor 216A and 226A and an MPLS enabled virtual switch 217A and 227A. Each virtual switch 217A and 227A comprises a flow entry table 218A and 228A that includes MPLS rules to indicate how the corresponding virtual switch should process packets it receives. The specific entries used for the movement of a VM will be discussed in detail below. Prior to the illustration of FIG. 9, the old virtualized server 915A has three active VMs: VM T1 490A, VM T2 490B, and VM T3 490C. FIG. 9 further illustrates a CEM 250 coupled with a CNM 260 through a management network 975. The management network further couples the CEM 250 and CNM 260 with the TORSs 215A and 225A thereby providing communication paths to the virtualized servers 215A and 225A.

This figure illustrates various points during the movement of the VM T3 490C from the old virtualized server 215A to the new virtualized server 225A. The terms old virtualized server and new virtualized server are reflective of the fact that prior to the movement VM T3 490C was active at the old virtualized server and after the movement VM T3 490C will be active at the new virtualized server 225A.

At point A, the CEM 250 begins moving begins moving VM T3 490C from the old virtualized server 215A to the new virtualized server 225A. Point A indicates a message being transmitted from the CEM 250 to the old virtualized server 215A indicating that a move of 9 T3 490C is being initiated. As long as VM T3 490C is active on the old virtualized server 215A then VM T3 490C can continue servicing traffic and the old flow rules are maintained in the flow entry table 218A. The hypervisor 216A prepares VM T3 490C for transfer to the new virtualized server 225A by saving the VM T3's 290C state information and directing the VM T3 290C to enter a standby or inactive state. At point B, the VM T3's 490C state information is transferred from the old virtualized server 215A to the new virtualized server 225A.

At some point, point C, during the deactivation of VM T3 490C, the CEM 450 decides that VM T3 490C can no longer service traffic. At this time, the CEM 250 notifies the CNM 260 that VM T3 490C cannot service traffic at this time because VM T3 490C is being moved. In reaction to this message, the CNM 260 modifies rules in the virtual switch's 217A flow entry table 218A. Thus, at point D, the CNM 260 installs a rule in the flow entry table 218A indicating that traffic matching VM T3's 490C MAC address as the destination MAC with a MPLS label linking the virtualized server 215A with the TORS 201A should be forwarded to the CNM 260 (or to some other entity). The CNM 260, or optionally some other entity, will provide intelligence with how to deal with traffic directed to the old virtualized server 215A meant for VM T3 490C.

In one embodiment, the CNM 260, or some other entity designed for this purpose, comprises a packet buffer 1166 used to store packets meant for VM T3 490C during the transition period. In this way, packets in the packet buffer 1166 meant for VM T3 490 can be sent to VM T3 490 once it is active at the new virtualized server 225A.

In one embodiment, when VM T3 490 is ready to service data at the new virtualized server 225A, the CEM 250 notifies CNM 260 that VM T3 490 is active again at point E. In another embodiment, the CNM 260 can detect that the VM T3 490 is active because the CNM 260 has received a packet (such as an ARP request) that originated from the VM T3 490 after it was reactivated. The CNM 260 reacts the VM T3 490 being ready to service data by modifying the flow entry table 228A.

At point F, the CNM 260 adds one or more entries to flow entry table 228A. The CNM 960 adds a flow rule to the flow entry table 228A that matches VM T3's 490C MAC address as the destination MAC along with matching an MPLS label linking the virtualized server 225A with the TORS 201C. This rule informs the virtual switch 227A that matching packets should have the MPLS label popped off and be forwarded to VM T3 490C. Other embodiments of the invention support additional rules. For example, one embodiment adds a rule indicating that DHCP packets originating from VM T3 490C should be forward to CNM 260. Another embodiment adds a rule indicating that ARP request originating from VM T3 490C should be forward to CNM 260.

At point G, the CNM 260 (or some other entity designed to buffer packets during the transition of VM from an old virtualized server to a new virtualized server) forwards accumulated packets destined for VM T3 490C to the virtualized server 225A so those packets may be delivered to VM T3 490C.

At point G, the CNM 260 modifies the CNM's 260 address mapping table 262 table to change the virtualized server MAC address entry for VM T3 490C to the destination new virtualized server's 225A MAC address. After these changes, any new ARP requests for VM T3's 490C in accordance with FIG. 9 will result in flow entry at the source virtual switch indicated traffic should be routed to 225A.

In one embodiment, the CNM 260 keeps the flow rule in place on the old virtualized server's 215A virtual switch 217A for any peer VMs that may still be exchanging traffic with VM T3 490C as those peer VMs may still expect VM T3 490C to be active on the old virtualized server 215A. If such a peer VM should send a peer data packet to VM T3 490C, it will be forwarded to the CNM 260 according to the rule installed at point D. The CNM 260 then modifies a flow rule on the peer VM'S virtualized server to forward traffic to VM T3 490C on the new virtualized server 225A using the MAC and IP address on the packet to locate the VM T3 490C. The CNM 260 forwards the peer data packet along to VM T3 490C on the new virtualized server 225A. In this way, all flow rules ultimately either time out or are modified to send traffic to VM T3 490C on the new virtualized server 225A. The CNM can allow the source virtual switch flow rules to time out after a predetermined grace period.

Managing Multicast Group Membership in the Cloud System—Overview

Figure 12:
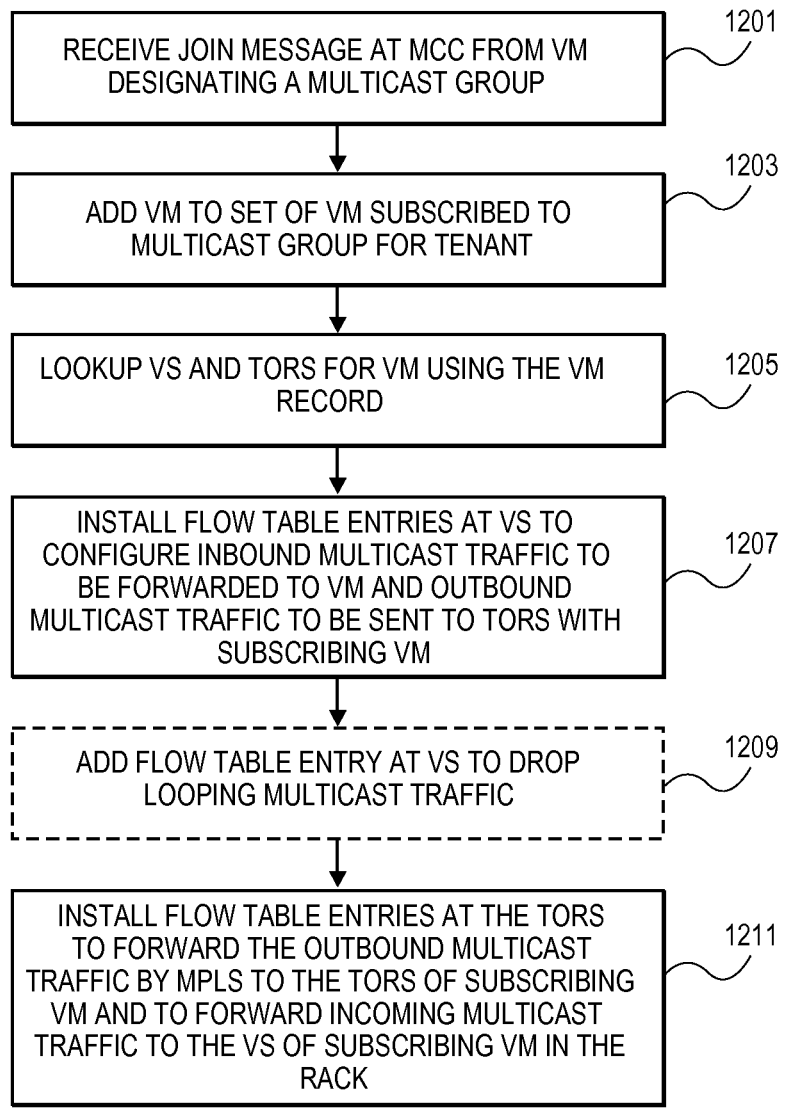
FIG. 12 is a flowchart of one embodiment of a process for a VM to subscribe to a multicast group in a cloud system.

FIG. 12 is a flowchart of one embodiment of a process for a virtual machine in the cloud system to join a multicast group. In one embodiment, the process is implemented by the MCC at the OpenFlow controller. The process can be initiated, at block 1201, in response to a multicast join message, such as an IGMP or MLD Report message, being received at the MCC. For example, the VM can join a multicast group by issuing an IGMP Report message via IPv4 or by issuing an MLD Report message via IPv6. These join messages include a multicast group address as well as the source address of the VM. In one embodiment, during the start-up of the CNM or similar component of the cloud system, the flow table of each VS is configured to include an entry that detects all IGMP or MLD messages and forwards them to the MCC to be processed.

The MCC maintains a multicast group management table (MGMT) that tracks each multicast group that has a least one VM subscribed on a per tenant basis. The MGMT is described in further detail herein below. When the VM join message is received, the VM is added to the set of VM for the tenant that are subscribing to the multicast group specified in the join message, at block 1203.

As described herein above, the MCC can also track the set of VM associated with each tenant as well as the associated VS and TORS for each VM. When the join message is received and the VM added to the MGMT, then a lookup using these data structures can be performed to determine the VS and TORS of the VM sending the join message, at block 1205. The VS and TORS information is then utilized to configure the flow table entries of each one. The VS is configured to forward outbound (relative to the VM) multicast traffic to a set of TORS that having VM subscribing to the multicast group via the TORS of the VM, at block 1207. The VS can also be configured to drop multicast group traffic that originated from the VM that is received from the TORS, because this multicast data has looped back and can therefore be discarded, at block 1209. The flow table entries of the TORS can be updated sequentially or in parallel with the flow table entries of the VS. The TORS flow table entries are updated to forward outbound multicast traffic using MPLS to the TORS of subscribing VM and to forward incoming multicast traffic to the VS of the VM subscribing to the multicast group in the rack, at block 1211. One embodiment of the process is described in further detail herein below.

When a VM leaves a multicast group a leave message is similarly sent by a VM and intercepted at the VS. The intercepted leave message is forwarded to the MCC. The MCC updates the MGMT to remove the VM from the set of VM subscribing to the identified multicast group in the leave message. The VS flow table is then updated to remove the VM from the set of VM that receives multicast traffic and similarly the TORS may be updated to remove the VS of the VM if it is the last VM associated with the VS subscribing to the multicast group. Also, each TORS in the cloud system can be updated to remove the TORS of the VM from the forwarding for the multicast group if the VM was the last VM associated with the TORS subscribing to the multicast group.

Joining a Multicast Group—Virtual Switch Configuration

Figure 13:
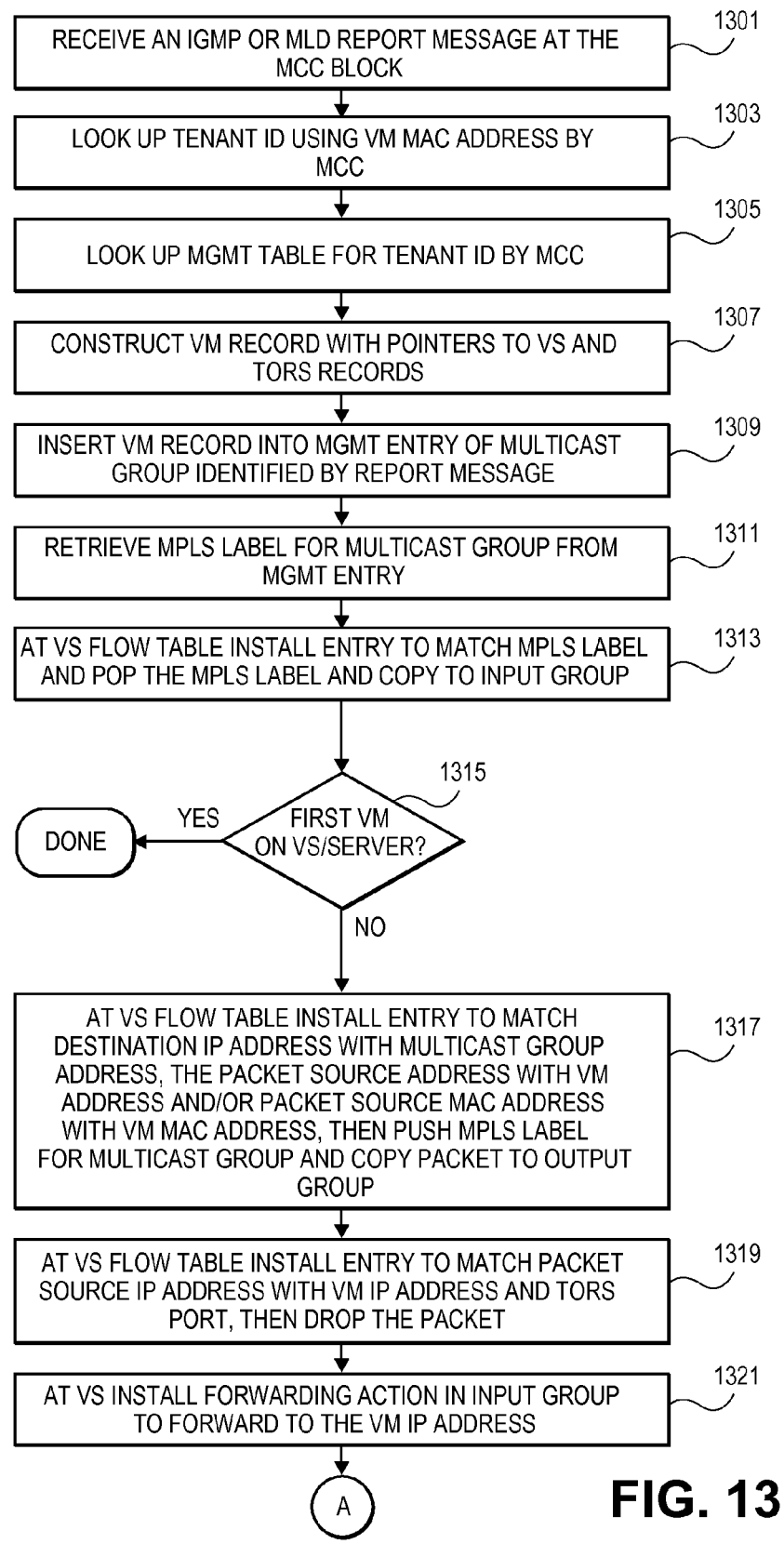
FIG. 13 is a flowchart of another embodiment of a process for a VM to subscribe to a multicast group in a cloud system where a virtual switch is configured.

FIG. 13 is a flowchart of one embodiment of a process for joining a multicast group by a VM and configuring the virtual switch of the VM. In one embodiment, the joining process is initiated when the MCC receives a Report message from a VM, at block 1301. As mentioned above, the CNM or similar component configures each VS to intercept and forward IGMP Report messages and MLD Report messages to the MCC to be processed. The IGMP Report message or MLD Report message includes the VM MAC address as a source address. The MCC performs a look up on the VM's MAC address using the data structures described herein above, for example a tenant table, to determine the Tenant ID for the VM, at block 1303. The MCC then performs a second look up in the MCC table with the tenant id to obtain a pointer to fetch the corresponding MGMT entry, at block 1305.

If a VM record does not exist, then the MCC constructs a VM record including a pointer to VS and TORS records of the VS and TORS associated with the VM, at block 1307. The VM record or a pointer to the VM record is inserted into the MGMT entry of the multicast group identified by the IGMP or MLD Report message, at block 1309. A MGMT entry for each multicast group can be created in response to a first request for joining the group, at multicast source start-up, at MCC start-up or at a similar time. The MGMT entries include an MPLS label to be utilized for each multicast group. The MCC retrieves the MPLS label for the multicast group for use in programming the flow tables of the VS and TORS associated with VM, at block 1311.

If the newly subscribed VM is the first VM associated with a VS to subscribe to the multicast group for that tenant, then the MCC sets up the following flow table entries in the flow table of the VS:

If a received packet's MPLS label matches the MPLS multicast routing label, at block 1315, pop the label and copy the packet to the OpenFlow group that handles input, e.g., $IG_n$.

An Openflow group table enables OpenFlow to represent additional methods of forwarding (e.g., select and all). Each group entry is identified by its group identifier and has an ordered list of action buckets. Each bucket contains a list of actions to execute and associated parameters. An $IG_n$ is an input group that is created when a new multicast group is added for a tenant. It contains the list of all the VMs the packet needs to be forwarded when it comes from the TORS with an MPLS label.

The IG is of type ALL, which results in the packet being duplicated and sent to each bucket in the group. $IG_n$ is incrementally modified as VMs are added to the multicast group to contain routes to the newly subscribed VMs. $IG_n$ is created in the virtual switches for every multicast group when a new tenant request comes to the controller.

In addition to the above configuration, for any newly subscribed VM for the particular tenant, the MCC modifies the flow table of the VS by adding the following flow entries and modifications to IG:

If the received packet's destination IP address matches the multicast group address, $DIP_{MG1}$, input port on which the tenants VM's lies, push the MPLS multicast routing label, $ML_{MG1}$, and copy the packet to an OpenFlow group that handles output, $OG_1$. The $OG_1$ is a group that is created for every tenant on the servers and is populated with entries as tenants join multicast groups.

If the source address matches the source address of the newly subscribed VM, $SIP_{VM1}$, and the packet is incoming on the TORS port, $P_{TORS1}$, drop the packet. The purpose of this rule is to prevent routing loops and will be explained in more detail in the next section.

Add a forwarding action in $IG_1$ that forwards the packet to $DIP_{VM1}$.

In regard to the construction of the input group IG and the output group OG defined for the flow table of the VS. The OG is of type ALL. Thus, packets are duplicated and sent to each bucket in the group. The buckets of the OG contain the following routes: One bucket forwards the packet out the output port leading to the TORS; and the rest of the buckets forward the packet to other VMs on the server that are members of the multicast group, with the exception of $VM_1$. The IG group is also of type ALL. It is used when for incoming packets from the TORS with an MPLS label. The MPLS label is popped out and the packet is sent to all the member VMs of the IG.

The MCC utilizes the list of VMs in the multicast group to determine which VMs are on the same VS as $VM_1$, by searching through the list of VMs and determining which VMs have the same VS as $VM_1$, in order to construct $OG_1$. $IG_1$ is constructed incrementally. As VMs on the VS subscribe to the multicast group, a forwarding action is added to $IG_1$.

Figure 14:
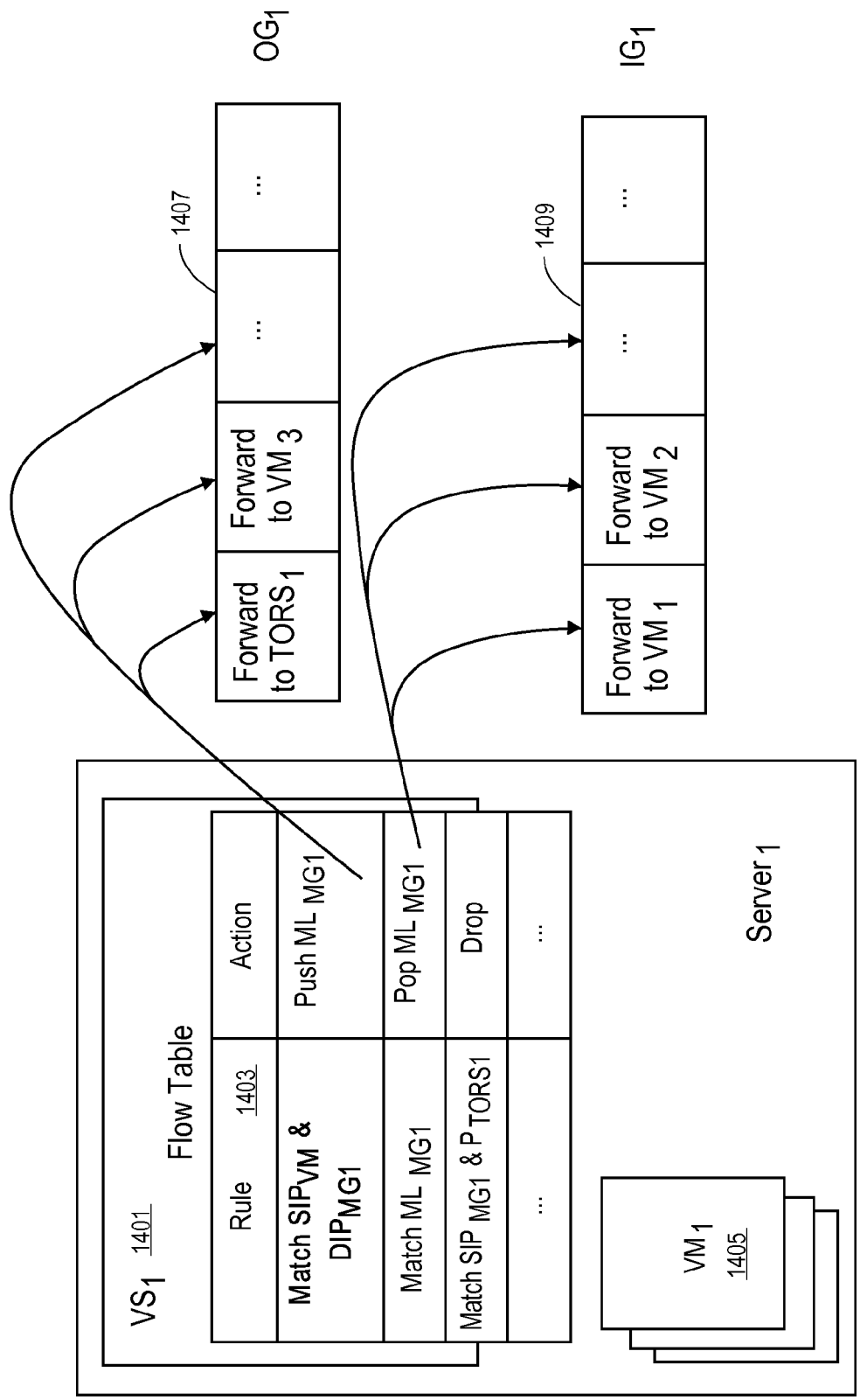
FIG. 14 is a diagram of one embodiment of a flow table configured to support a VM subscribed to a multicast group in a cloud system.

FIG. 14 is a diagram of one embodiment of an example flow table of a virtual switch. The VS 1401 can handle the unicast and multicast data traffic for a set of VM 1405 in a cloud system. The VM 1405 and VS can be hosted or executed by a server executing a hypervisor or similar system as described further herein above. All data traffic to and from the VM 1405 passes through the VS 1401, because it serves as an abstraction/virtualization of the network communication ports of the VM 1405 enabling their movement across the cloud system.

The flow table 1403 of the VS 1401 includes a set of flow table entries that are each divided into rules and actions. The rules define the conditions under which the actions are executed. In scenarios where multiple actions are required to be taken action groups can be defined such as the OG 1407 and IG 1409. These groups can be configured such that any combination of actions in the group can be taken dependent on the configuration of the rule and groups where specific criteria can further effect the execution of the actions in the group.

In the example embodiment of FIG. 14, the flow table has been configured with a set of example rules and actions. In the first flow table entry manages outbound multicast traffic originating from VMs associated with the VS. The flow table entry looks for packets with source IP addresses from the local VMs and destination IP addresses associated with multicast groups. When a match is found, the actions include encapsulating or 'pushing' the MPLS label of the multicast group onto the packet, then forwarding the encapsulated packet to the outbound group OG which defines additional actions to be taken including forwarding the packet to the TORS and other subscribing VMs associated with the VS.

The next flow table entry manages incoming packets by looking for matching MPLS labels for a multicast group, then removing the label as the action. The decapsulated packet is then forwarded to local subscribing VMs associated with the VS. The final flow table entry looks for a source IP and TORS port match and defines a drop action to discard such packets, because they are packets which have looped back to the VS from the TORS. An IGMP report is issued only when a node would want to receive a multicast. The node that does multicast at an address does not issue an IGMP Report message. Therefore, "joining" is inferred on a multicast address by forwarding multicast addresses to the controller. The controller must then install a flow just like how flows are installed when IGMP Report messages are received.

Joining a Multicast Group—Top of Rack Switch Routes

Figure 15:
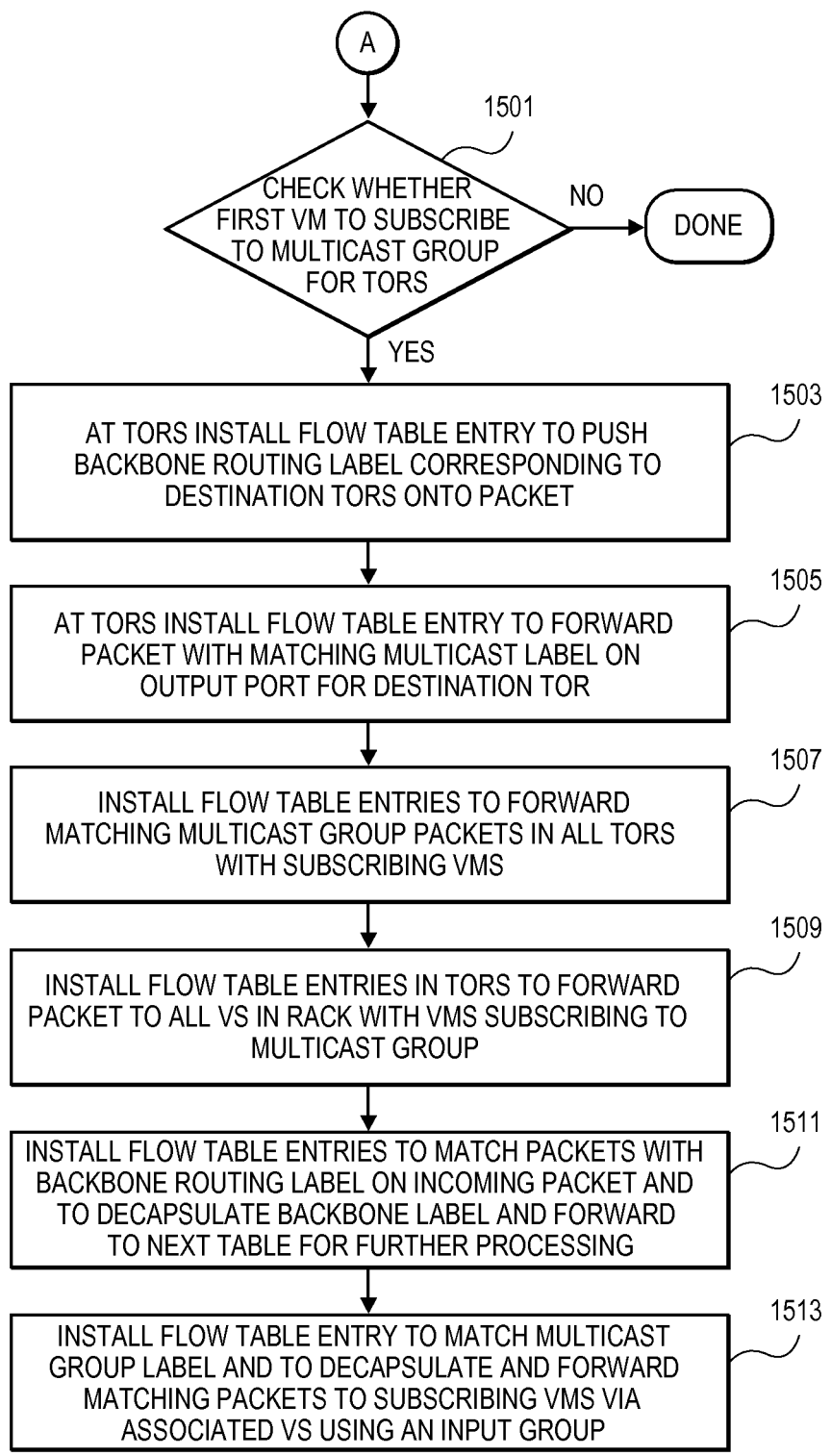
FIG. 15 is a flowchart of another embodiment of a process for a VM to subscribe to a multicast group in a cloud system where a top of the rack switch is configured.

FIG. 15 is a diagram of one embodiment of a process for configuring a TORS for the join process. After the VS routes are installed, or in parallel, the MCC installs flow routes for the multicast group in the TORS, if those routes have not already been installed, i.e., both the TORS associated with the VM and other TORS in the cloud system. If another VM on the same server or VS has already subscribed to the multicast group, then no additional TORS routes are necessary for that TORS, this check is made for each TORS in the cloud system or just for the TORS associated with the VM that issued the join message, at block 1501.

For outgoing packets, the MCC installs on the TORS a flow route in the first table whose rule matches packets with MPLS labels for the multicast group (i.e., $ML_{MG1}$). The action duplicates the packet and sends the duplicates to the TORS Output Group, $TOG_1$. Each action bucket in $TOG_1$ contains the following actions:

Push a backbone routing label, $BRL_n$, corresponding to the destination TORS, $DTORS_n$, onto the packet, at block 1503; and Forward the packet out the output port leading to $DTORS_n$, at block 1505

If there is already an action bucket for $DTORS_n$, then the MCC need not write any new flow rules. The MCC determines which DTORS receive packets by going through the list of VMs and extracting out the set of TORS that route packets to VMs in the multicast group. Note that this procedure only needs to be done when the first VM in the rack initially joins the multicast group. After that, the TOG is incrementally updated as other first-joining VMs on other racks newly join the multicast group, as described in the next paragraph.

If a VM is the first VM on a rack joining the multicast group, the MCC must also install a route to the TORS of the newly subscribing VM in all other TORS serving racks with VMs that are members of the multicast group, at block 1507. This procedure should be necessary only once, when the first VM on the rack served by the source TORS initially joins the multicast group. The MCC determines which TORS require routes by searching through the list of VMs in the multicast group, and extracting the list of TORS serving the VMs in the group. Then the MCC installs an action in the TOG of each TORS in the list, routing packets to the new source TORS.

In addition to servers on other racks, at block 1509, the TORS needs to forward the multicast packet to other servers in the same rack that are subscribed to the multicast group. For each server on the rack with VSs subscribed to the group, there is an action bucket with an action forwarding the packet towards the VS. Note that this means the VS from which the packet originated will also receive a packet. It is for this purpose that the VS contains a rule dropping a packet incoming from the TORS having the source address the same as the sending VM, to prevent routing loops.

For incoming packets, two flow tables are used. The first flow table contains one rule matching each backbone routing label corresponding to a TORS serving VMs in the multicast group. The action pops the backbone routing label and sends the packet to the next table, at block 1511. The second table contains a rule matching the multicast routing label, $ML_{MG1}$. The action duplicates the packet and sends it to the TORS input group, $TIG_1$. Each bucket in the input group contains an action forwarding the packet to one of the VS or servers on the rack on which at least one VM is running that is a member of the multicast group, at block 1513. Exactly as for output, when a VM from a rack is the first one to join in the MCC must install rules in all the TORS serving the rack with VM's as members of multicast group.

Figure 16:
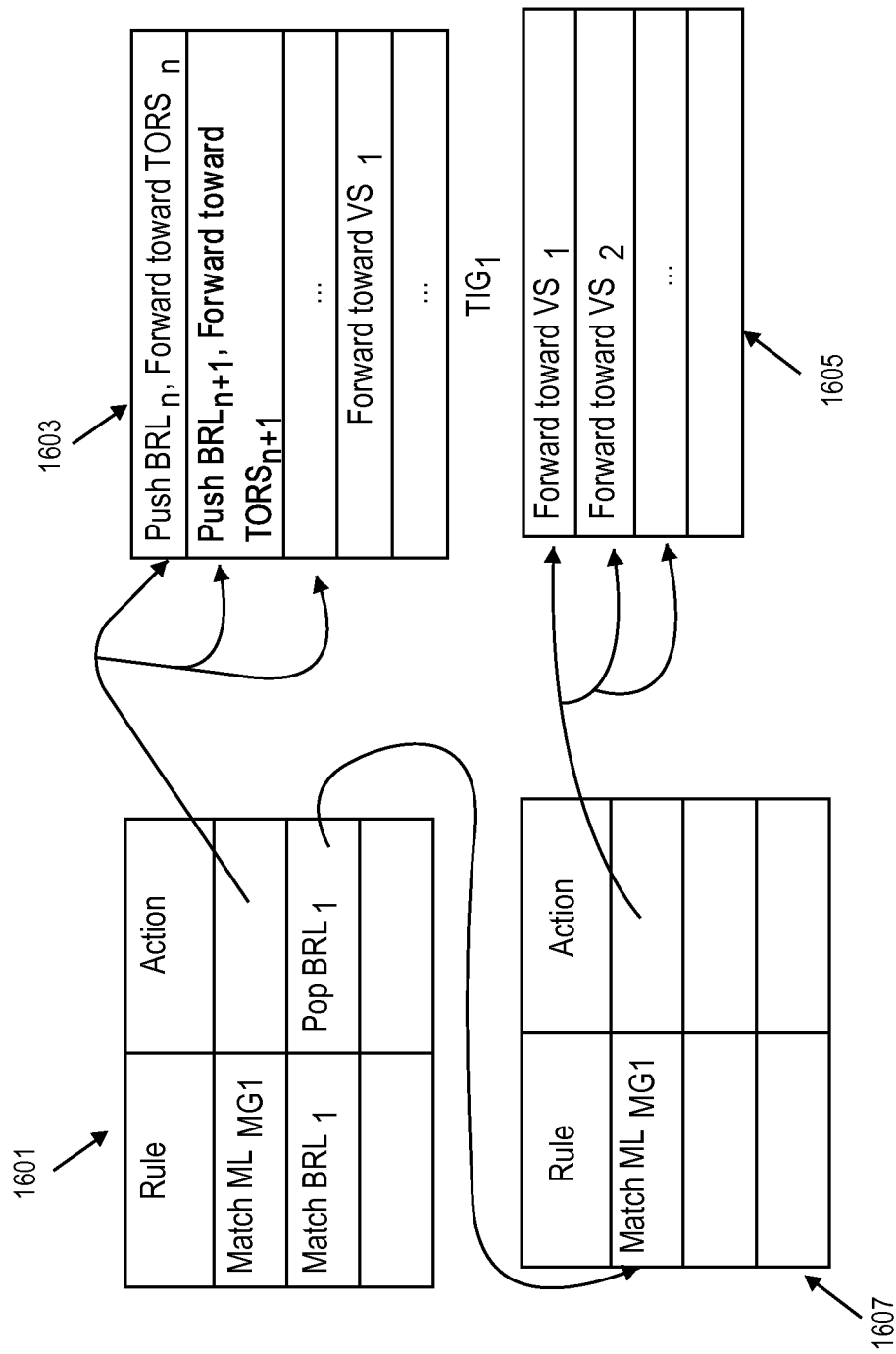
FIG. 16 is a diagram of one embodiment of a flow table of a top of rack switch configured to support a VM subscribed to a multicast group in a cloud system.

FIG. 16 is a diagram of the flow tables of a TORS with an example configuration. The TORS utilize a two flow table configuration for multi-level packet processing. In the first flow table 1601, a set of example entries are shown. The first entry manages outbound multicast traffic looking for matches for particular multicast groups using the MPLS label. These matching packets are encapsulated with the backbone MPLS label and sent to each TORS in the cloud system with subscribing VM for the multicast group using the TORS output group 1603. In bound traffic is handled with the second flow table entry in the first flow table, which matches packets on the backbone label and decapsulates these packets. The decapsulated packets are then sent to the second flow table 1607.

In the second flow table 1607, the packet is matched for the MPLS label to determine whether it matches a multicast group MPLS label. If a match is found, the packet is copied to the TORS input group, which forward the packet to each VS with a subscribing VM in the rack.

Note that as in the unicast processes described above, the backbone routes will not change and so switches in the cloud system backbone need not be touched. In addition, the backbone labels can be exactly the same as for the unicast case described above, or the cloud system operator may choose to reserve certain routes for multicast traffic and designate them with specific labels.

Leaving a Multicast Group

Figure 17:
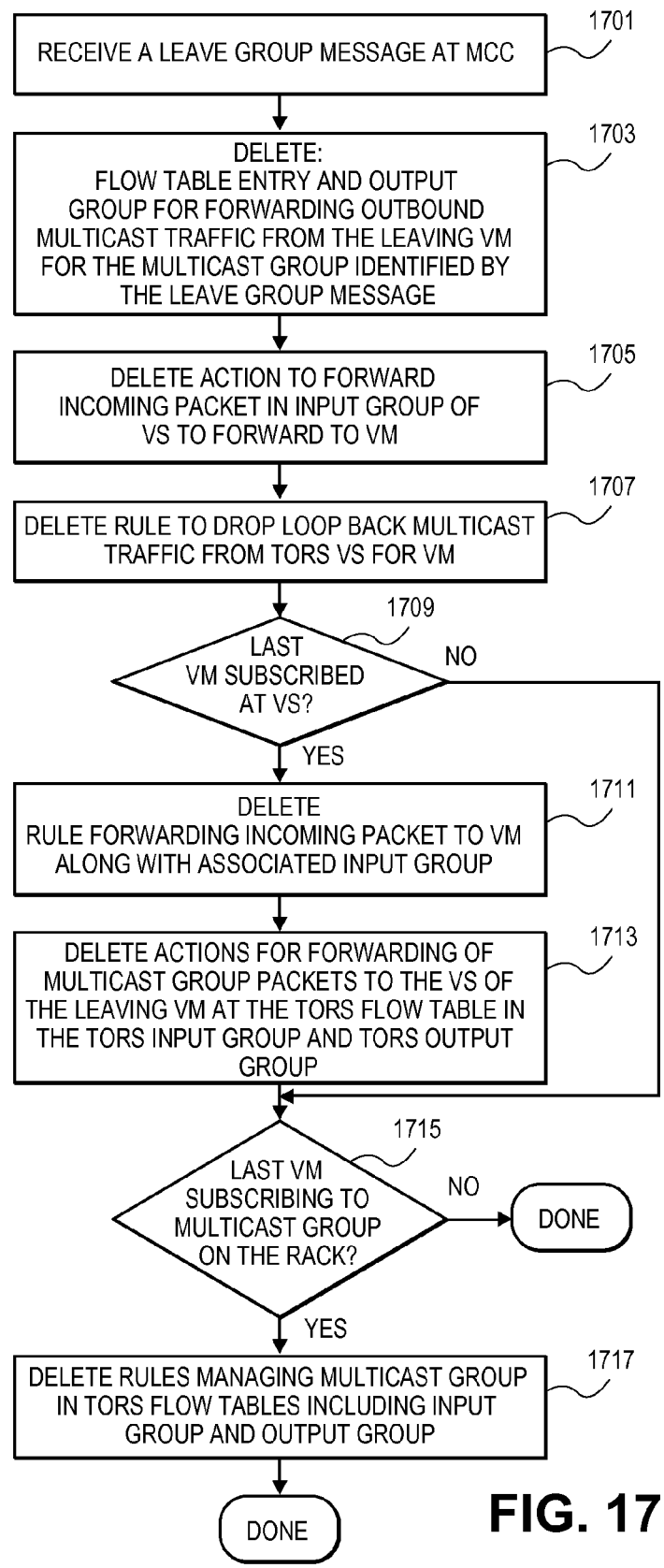
FIG. 17 is a flowchart of one embodiment of a process for supporting a VM leaving a multicast group in a cloud system.

FIG. 17 is a flowchart of one embodiment of a process for handling Leave Group messages in the cloud system. When a VM leaves a multicast group, it sends an IGMP Leave Group message in IPv4 and a MLD Leave Group message in IPv6. When a server starts up, the CNM installs an OpenFlow rule in the server's VS that forwards all Leave Group messages to the MCC. Depending on what VMs are subscribed to the group, there are three case affecting where flow routing needs to be modified:

first, on the server of VS where the VM is leaving the multicast group, there are other VMs subscribed to the multicast group;

second, the VM is the last to leave the group on the server or VS, but there are other VMs on other racks and other servers of VS in the rack that are subscribed to the same multicast group; and third, the VM is the last to leave the multicast group on the rack.

The MCC determines which of these cases to consider by searching through the list of VMs in the multicast group, using the appropriate MGMT, and sorting them according to which VMs are on the same server of VS as the leaving VM and which are on other servers of VS in the rack. Each of the possible cases is addressed herein below.

Other VMs Still Subscribed on the Same VS

If there are other VMs subscribed on the same server of VS, then the MCC need only delete the following rules and actions in the flow table of the VS:

The rule matching the source IP address of the VM leaving ($SIP_{VM1}$) and destination IP address of the multicast group ($DIP_{MG1}$) and forwarding outgoing packets from $VM_1$. This also deletes associated $OG_1$. This rule and the associated actions and OG managed the outbound multicast traffic from the leaving VM and can therefore be deleted at block 1703.

The action in $IG_1$ forwarding an incoming packet to $VM_1$, but not the entire $IG_1$. This rule forwards incoming multicast group traffic to the leaving VM and can therefore be deleted at block 1705.

The rule matching the $SIPI_{VM1}$ and $P_{TORS1}$ that drops the packet to prevent routing loops. This rule prevents loopback of outbound multicast traffic of the leaving VM and can therefore be deleted at block 1707.

A check can then be made whether any of the other cases apply at blocks 1709 and 1715. If not, then no other rules need to be modified and the process completes.

Last VM on the VS to Leave the Group

If the leaving VM is the last VM on the VS to leave the multicast group, then the rule forwarding an incoming packet to the VM and the associated $IG_1$ are additionally deleted, at block 1711. In addition, the actions in the TORS output group ($TOG_1$) and the TORS input group ($TIG_1$) forwarding the packets of the multicast group to $VS_1$ associated with the VM are deleted, at bloc 1713.

A check can then be made whether the leaving VM is the last VM subscribing to the multicast group on the rack, i.e., associated with the TORS, at block 1715. If it is not the last VM subscribing to the multicast group on the TORS, then the process is complete.

Last VM on the Rack to Leave the Group

If the VM is the last VM on the rack to leave the multicast group, than additionally the two rules in the first flow table and one rule in the second flow table of $TORS_1$, along with their respective input and output groups, are removed at block 1717.

Handling VM Movement

Figure 18:
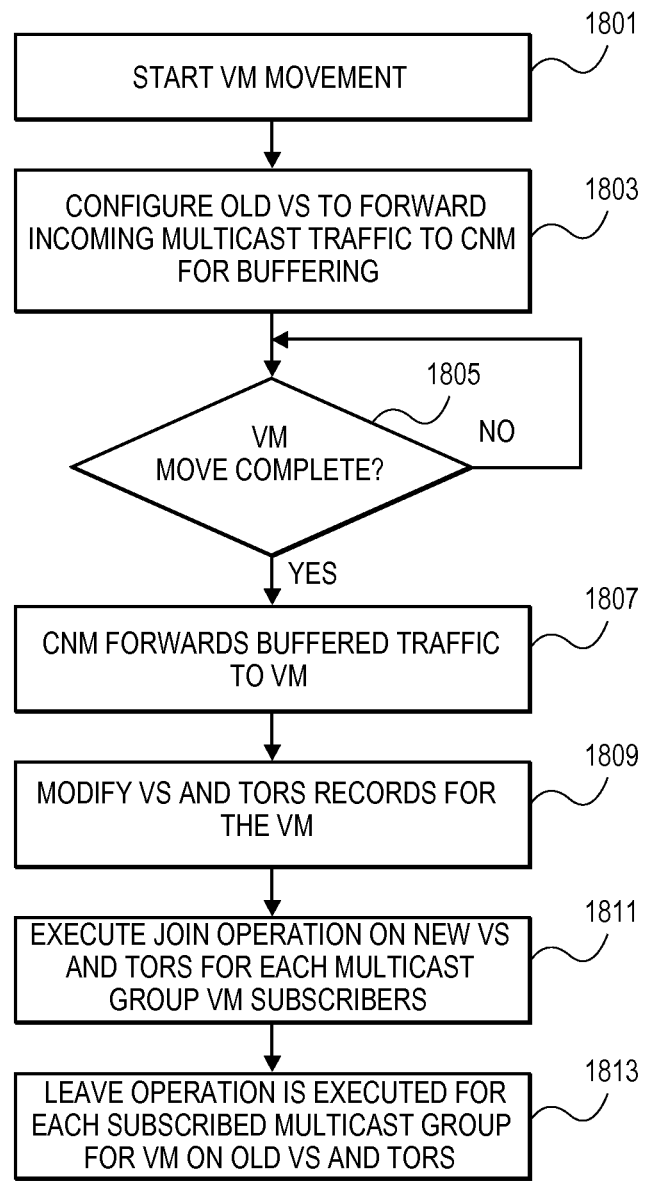
FIG. 18 is a flowchart of one embodiment of a process for supporting the movement of a VM between virtual servers in a cloud system.

FIG. 18 is a flowchart of one embodiment of the process for handing VM movement with support for multicast using MPLS in the cloud system. VM movement between servers and VS can be handled by a mixture of the techniques described above and the general VM movement techniques described in regard to unicast above. This process is initiated by the movement of the VM for purposes of load balancing or similar reasons, at block 1801.

During movement, the routes directing multicast traffic to the moving VM in the VS and TORS associated with the moving VM are maintained until the VM is executing in the new location and is ready to receive traffic. During the VM move, according to the procedure described above in regard to unicast, a new route (i.e., flow table entry) is placed in the old VS to catch the multicast as well as unicast traffic destined for the moving VM, and send it to the CNM for buffering, at block 1803.

The buffering continues until the VM move has completed, at block 1805. The CNM can then be notified to forward buffered packets to the VM at the new location, at block 1807. Prior to the new VM becoming active, if the VM is a member of a multicast group, the VS and TORS records in the multicast group VM record need to be modified to reflect the new location, at block 1809. In addition, the procedures described above for joining a multicast group must be executed on the new VS and TORS, for each multicast group that the VM is subscribed to, at block 1811. A leave operation is also performed in for each subscribed multicast group for the old VS and TORS, at block 1813.

Figure 19:
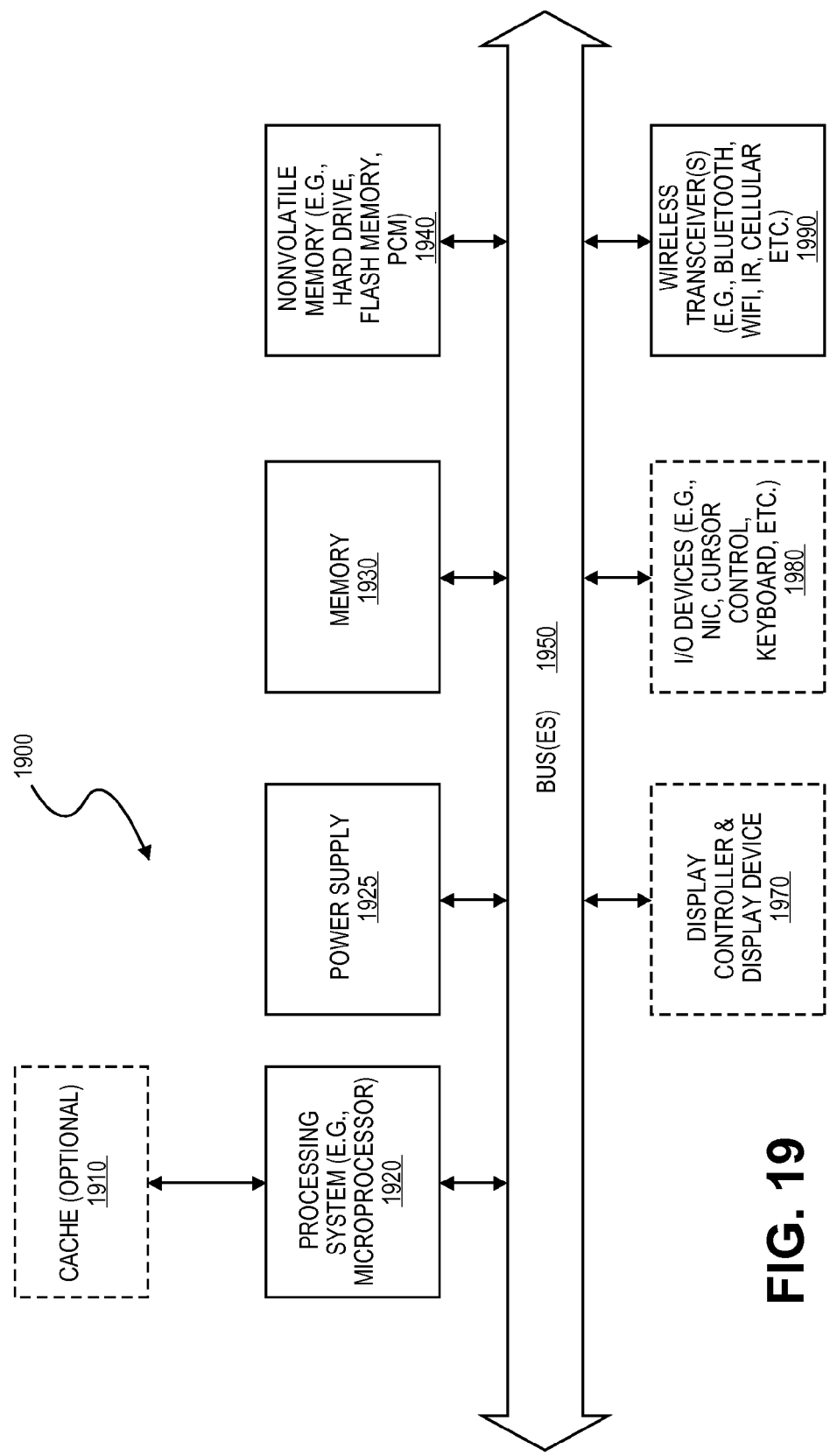
FIG. 19 illustrates a block diagram of an exemplary computer system according to embodiments of the invention.

FIG. 19 illustrates a block diagram of an exemplary computer system according to embodiments of the invention. The exemplary computer system 1000 in FIG. 10 can be used to implement the TORS 201A, the virtualized server 205A, the CEM 250, the MCC 290 and/or the CNM 260. If the CEM 250, MCC 290 and/or the CNM 260 are implemented at an OpenFlow controller, this system can execute the OpenFlow controller. Those skilled in the art would recognize that other computer systems used to implement these devices may have more or less components and may be used to in embodiments of the invention.

The computer system 1900 includes a bus(es) 1050 which is coupled with a processing system 1915, a power supply 1920, volatile memory 1925 (e.g., double data rate random access memory (DDR-RAM), single data rate (SDR) RAM), nonvolatile memory 1930 (e.g., hard drive, flash memory, Phase-Change Memory (PCM). The processing system 1915 may be further coupled to a processing system cache 1910. The processing system 1915 may retrieve instruction(s) from the volatile memory 1925 and/or the nonvolatile memory 1930, and execute the instruction to perform operations described above. The bus(es) 1950 couples the above components together and further couples a display controller 1070, one or more input/output devices 1080 (e.g., a network interface card, a cursor control (e.g., a mouse, trackball, touchscreen, touchpad, etc.), a keyboard, etc.), and, optionally, one or more wireless transceivers (e.g., Bluetooth, WiFi, Infrared, etc.). In one embodiment, the display controller 1970 is further coupled to a display device 1975.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a multicast cloud controller ("MCC") in a cloud system to manage multicast traffic in a cloud network, the MCC coupled to at least one virtualized server for hosting one or more virtual machines ("VM"), wherein the virtualized server comprises at least one virtual switch ("VS") that supports multiprotocol label switching (MPLS) and the virtual switch is coupled to a top of rack switch ("TORS") that supports MPLS, the method comprising the steps of:

receiving a join message at the MCC, wherein the join message indicates that a VM has requested to join a multicast group;

adding the VM to a set of VMs of a tenant, where the set of VMs are subscribed to the multicast group;

looking up a VS and a TORS for the VM by the MCC using a VM record maintained by the MCC;

installing at least one flow table entry at the VS for the VM, the at least one flow table entry to configure inbound multicast traffic of the multicast group to be forwarded to the VM and to configure outbound multicast traffic of the multicast group to be sent to the TORS of the VM; and installing at least one flow table entry at the TORS of the VM, the at least one flow table entry of the TORS to configure the TORS to forward the outbound multicast traffic of the multicast group by MPLS to other TORS of the cloud system with VMs subscribing to the multicast group and to configure the TORS to forward incoming multicast traffic of the multicast group to the VS of the VM.

2. The method of claim 1, further comprising the step of:
installing a flow table entry at the VS of the VM to drop multicast group traffic looped back from the TORS of the VM.

3. The method of claim 1, wherein receiving the join message further comprises the step of:
receiving any one of a internet group multicast protocol (IGMP) report message or a multicast discovery listener (MLD) report message from the VM having a multicast group address.

4. The method of claim 1, further comprising the step of:
looking a tenant ID up by the MCC using a MAC address of the VM in the join message.

5. The method of claim 1, further comprising the step of:
looking up a multicast group management table for a tenant by the MCC using a tenant ID derived from the join message.

6. The method of claim 1, further comprising the step of:
constructing a VM record with a pointer to a VS record and a pointer to a TORS record, the VM record associated with the VM, the VS record associated with the VS of the VM and the TORS record associated with the TORS of the VM.

7. The method of claim 1, further comprising the step of:
inserting a VM record for the VM into a multicast group management table entry of the multicast group identified by the multicast group address in the join message.

8. The method of claim 1, further comprising the step of:
retrieving an MPLS label of the multicast group from a multicast group management table entry of the multicast group identified by the multicast group address in the join message for use in configuring the VS of the VM and the TORS of the VM to handle multicast traffic.

9. The method of claim 1, further comprising the step of:
installing a flow table entry at VS of VM to match a destination internet protocol address of a packet with the multicast group address, to match the packet source address with an internet protocol address of the VM and to match a source MAC address with a MAC address of the VM, then push an MPLS label for the multicast group onto the packet and copy packet to an output group.

10. The method of claim 1, further comprising the step of:
installing a flow table entry at VS of VM to match a source IP address of the packet with IP address of the VM and to match a port of the TORS, then to drop the packet to prevent looping.

11. The method of claim 1, further comprising the step of:
installing a forwarding action in an input group of the VS to forward multicast group traffic to an internet protocol address of the VM.

12. The method of claim 1, further comprising the step of:
checking whether the VM is a first VM to subscribe to a multicast group at the TORS.

13. The method of claim 12, where the VM is the first VM, further comprising the step of:
installing a flow table entry at the TORS to push backbone routing label onto a packet.

14. The method of claim 12, where the VM is the first VM, further comprising the step of:
installing a flow table entry at the TORS to match a multicast label and forward to output port of a destination TORS.

15. The method of claim 12, where the VM is the first VM, further comprising the step of:
installing a flow table entry at the other TORS to forward multicast group packets to other TORS with subscribing VMs.

16. The method of claim 12, where the VM is the first VM, further comprising the step of:
installing flow table entries at the TORS to forward multicast group packets to all VS in rack with VM subscribing to the multicast group.

17. The method of claim 12, where the VM is the first VM, further comprising the step of:
installing a flow table entry at the TORS to match a backbone routing label in a packet, to decapsulate the backbone routing label and to forward the packet to next table of the TORS.

18. The method of claim 17, further comprising the step of:
installing a flow table entry to match a multicast group label in the packet, to decapsulate the multicast group label, and to forward the packet to subscribing VMs via associated VSs using an input group.

19. The method of claim 1, further comprising the step of:
inferring a join of a multicast source from a multicast address; and
installing at least one flow table entry at a TORS of the multicast source, the at least one flow table entry of the TORS of the multicast source to configure the TORS to forward the outbound multicast traffic of the multicast group by MPLS to other TORS of the cloud system with VMs subscribing to the multicast group.

20. A method performed by a multicast cloud controller ("MCC") in a cloud system to manage multicast traffic in a cloud network, the MCC coupled to at least one virtualized server for hosting one or more virtual machines ("VM"), wherein the virtualized server comprises at least one virtual switch ("VS") that supports multiprotocol label switching (MPLS) and the virtual switch is coupled to a top of rack switch ("TORS") that supports MPLS, the method comprising the steps of:
receiving a join message in a form of an internet group management protocol report message or multicast listener discovery report message at the MCC, wherein the join message indicates that a VM has requested to join a multicast group;
adding the VM to a set of VMs of a tenant, where the set of VMs are subscribed to the multicast group, the set of VMs tracked in a multicast group management table along with a multicast group label;
looking up a VS and a TORS for the VM by the MCC using a VM record maintained by the MCC;
installing a forwarding action in an input group of the VS to forward multicast group traffic to an internet protocol address of the VM; and
checking whether the VM is a first VM to subscribe to a multicast group at the TORS,
where the VM is the first VM,
  installing a flow table entry at the TORS to push backbone routing label onto a packet,
  installing a flow table entry at the TORS to match a multicast label and forward the packet to an output port of a destination TORS,
  installing a flow table entry at the other TORS to forward multicast group packets to other TORS with subscribing VMs,
  installing flow table entries at the TORS to forward multicast group packets to all VS in rack with VM subscribing to the multicast group,
  installing a flow table entry at the TORS to match a backbone routing label in a packet, to decapsulate the backbone routing label and to forward the packet to next table of the TORS, and
  installing a flow table entry to match a multicast group label in the packet, to decapsulate the multicast group label, and to forward the packet to subscribing VMs via associated VSs using an input group.

21. A multicast cloud controller ("MCC") implemented in a cloud system, the MCC coupled to at least one virtualized server for hosting one or more virtual machines ("VM"), wherein the virtualized server comprises at least one virtual switch ("VS") that supports multiprotocol label switching (MPLS) and the virtual switch is coupled to a top of rack switch ("TORS") that supports MPLS, the MCC comprising:
a processor to execute a join group module,
the join group module to manage multicast group join operations, where the join group module is configured to receive a join message in a form of an internet group management protocol report message or multicast listener discovery report message at the MCC, wherein the join message indicates that a VM has requested to join a multicast group, the join group module further configured to add the VM to a set of VMs of a tenant, where the set of VMs are subscribed to the multicast group, to look up a VS and a TORS for the VM by the MCC using a VM record maintained by the MCC, configured to install at least one flow table entry at the VS for the VM, the at least one flow table entry to configure inbound multicast traffic of the multicast group to be forwarded to the VM and to configure outbound multicast traffic of the multicast group to be sent to the TORS of the VM, and configured to install at least one flow table entry at the TORS of the VM, the at least one flow table entry of the TORS to configure the TORS to forward the outbound multicast traffic of the multicast group by MPLS to other TORS of the cloud system with VMs subscribing to the multicast group and to configure the TORS to forward incoming multicast traffic of the multicast group to the VS of the VM.

22. The MCC of claim 21, wherein the join group module is further configured to install a flow table entry at the VS of the VM to drop multicast group traffic looped back from the TORS of the VM.

23. The MCC of claim 21, wherein receiving the join message and wherein the join group module is further configured to receive any one of an internet group multicast protocol (IGMP) report message or a multicast discovery listener (MLD) report message from the VM having a multicast group address.

24. The MCC of claim 21, wherein the join group module is configured to look a tenant ID up by the MCC using a MAC address of the VM in the join message.

25. The MCC of claim 21, wherein the join group module is configured to look up a multicast group management table for a tenant by the MCC using a tenant ID derived from the join message.

26. The MCC of claim 21, wherein the join group module is configured to construct a VM record with a pointer to a VS record and a pointer to a TORS record, the VM record associated with the VM, the VS record associated with the VS of the VM and the TORS record associated with the TORS of the VM.

27. The MCC of claim 21, wherein the join group module inserts a VM record for the VM into a multicast group management table entry of the multicast group identified by the multicast group address in the join message.

28. The MCC of claim 21, wherein the join group module is configured to retrieve an MPLS label of the multicast group from a multicast group management table entry of the multicast group identified by the multicast group address in the join message for use in configuring the VS of the VM and the TORS of the VM to handle multicast traffic.

29. The MCC of claim 21, wherein the join group module is configured to install a flow table entry at VS of VM to match a destination internet protocol address of a packet with the multicast group address, to match the packet source address with an internet protocol address of the VM and to match a source MAC address with a MAC address of the VM, then push an MPLS label for the multicast group onto the packet and copy packet to an output group.

30. The MCC of claim 21, wherein the join group module is configured to install a flow table entry at VS of VM to match a source IP address of the packet with IP address of the VM and to match a port of the TORS, then to drop the packet to prevent looping.

31. The MCC of claim 21, wherein the join group module is configured to install a forwarding action in an input group of the VS to forward multicast group traffic to an internet protocol address of the VM.

32. The MCC of claim 21, wherein the join group module checks whether the VM is a first VM to subscribe to a multicast group at the TORS.

33. The MCC of claim 32, where the join group module is configured to install a flow table entry at the TORS to push backbone routing label onto a packet.

34. The MCC of claim 32, where the VM is the first VM and where the join group module is configured to install a flow table entry at the TORS to match a multicast label and forward to output port of a destination TORS.

35. The MCC of claim 32, where the VM is the first VM and where the join group module is configured to install a flow table entry at the other TORS to forward multicast group packets to other TORS with subscribing VMs.

36. The MCC of claim 32, where the VM is the first VM and the join group module is configured to install flow table entries at the TORS to forward multicast group packets to all VS in rack with VM subscribing to the multicast group.

37. The MCC of claim 32, where the VM is the first VM and the join group module is configured to install a flow table entry at the TORS to match a backbone routing label in a packet, to decapsulate the backbone routing label and to forward the packet to next table of the TORS.

38. The MCC of claim 37, wherein the join group module is configured to install a flow table entry to match a multicast group label in the packet, to decapsulate the multicast group label, and to forward the packet to subscribing VMs via associated VSs using an input group.

39. The MCC of claim 21, wherein the join module is further configured to infer a join of a multicast source from a multicast address, and install at least one flow table entry at a TORS of the multicast source, the at least one flow table entry of the TORS of the multicast source to configure the TORS to forward the outbound multicast traffic of the multicast group by MPLS to other TORS of the cloud system with VMs subscribing to the multicast group.

40. A multicast cloud controller ("MCC") is implemented in a cloud system to manage multicast traffic in a cloud network, the MCC coupled to at least one virtualized server for hosting one or more virtual machines ("VM"), wherein the virtualized server comprises at least one virtual switch ("VS") that supports multiprotocol label switching (MPLS) and the virtual switch is coupled to a top of rack switch ("TORS") that supports MPLS, MCC comprises:
  a processor to execute a join group module,
    the join group module to manage multicast group join operations, where the join group module is configured to install the VM to a set of VMs of a tenant, where the set of VMs are subscribed to the multicast group, the set of VMs tracked in a multicast group management table along with a multicast group label, to look up a VS and a TORS for the VM using a VM record maintained by the MCC, to install a forwarding action in an input group of the VS to forward multicast group traffic to an internet protocol address of the VM, and checking whether the VM is a first VM to subscribe to a multicast group at the TORS, where the VM is the first VM, to install a flow table entry at the TORS to push backbone routing label onto a packet, to install a flow table entry at the TORS to match a multicast label and forward the packet to an output port of a destination TORS, to install a flow table entry at the other TORS to forward multicast group packets to other TORS with subscribing VMs, to install flow table entries at the TORS to forward multicast group packets to all VS in rack with VM subscribing to the multicast group, to install a flow table entry at the TORS to match a backbone routing label in a packet, to decapsulate the backbone routing label and to forward the packet to next table of the TORS, and install a flow table entry to match a multicast group label in the packet, to decapsulate the multicast group label, and to forward the packet to subscribing VMs via associated VSs using an input group.

* * * * *

UNITED STATES PATENT AND TRADEMARK OFFICE
CERTIFICATE OF CORRECTION

| | | |
|---|---|---|
| PATENT NO. | : 8,831,000 B2 | |
| APPLICATION NO. | : 13/649026 | |
| DATED | : September 9, 2014 | |
| INVENTOR(S) | : Mishra et al. | |

It is certified that error appears in the above-identified patent and that said Letters Patent is hereby corrected as shown below:

On the Title Page, in item "(71)", under "Applicant", in Column 1, Line 1, delete "Ericsson," and insert -- "Ericsson (Publ), --, therefor.

In the Drawings

In Fig 6, Sheet 6 of 19, delete Tag "455" and insert Tag -- 255 --, therefor.

In Fig 6, Sheet 6 of 19, delete " HYPERVISOR 215A " and insert -- HYPERVISOR 216A --, therefor.

In Fig 8, Sheet 8 of 19, delete Tag "830" and insert Tag -- 630 --, therefor.

In Fig 11, Sheet 11 of 19, delete Tag "962" and insert Tag -- 262 --, therefor.

In Fig 11, Sheet 11 of 19, delete Tag "266" and insert Tag -- 1166 --, therefor.

In Fig 19, Sheet 19 of 19, delete Tag "1940" and insert Tag -- 1930 --, therefor.

In Fig 19, Sheet 19 of 19, delete Tag "1930" and insert Tag -- 1925 --, therefor.

In Fig 19, Sheet 19 of 19, delete Tag "1925" and insert Tag -- 1920 --, therefor.

In Fig 19, Sheet 19 of 19, delete Tag "1920" and insert Tag -- 1915 --, therefor.

Signed and Sealed this
Eighteenth Day of August, 2015

Michelle K. Lee
*Director of the United States Patent and Trademark Office*

CERTIFICATE OF CORRECTION (continued)
U.S. Pat. No. 8,831,000 B2

In the Specification

In Column 11, Line 28, delete "CMN" and insert -- CNM --, therefor.

In Column 11, Line 29, delete "CMN" and insert -- CNM --, therefor.

In Column 15, Line 17, delete "server 216A" and insert -- server 215A --, therefor.

In Column 17, Line 23, delete "T4+s" and insert -- T4's --, therefor.

In Column 18, Line 18, delete "CEM 450" and insert -- CEM 250 --, therefor.

In the Claims

In Column 26, Lines 48-49, in Claim 3, delete "multicast discovery listener (MLD)" and insert -- multicast listener discovery (MLD) --, therefor.

In Column 29, Lines 18-19, in Claim 23, delete "multicast discovery listener (MLD)" and insert -- multicast listener discovery (MLD) --, therefor.

In Column 29, Line 60, in Claim 33, delete "where" and insert -- wherein --, therefor.

In Column 30, Line 20, in Claim 39, delete "join module" and insert -- join group module --, therefor.